US012192239B2

(12) United States Patent
Abotabl et al.

(10) Patent No.: US 12,192,239 B2
(45) Date of Patent: Jan. 7, 2025

(54) PHYSICAL LAYER SECURITY ACTIVATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 571 days.

(21) Appl. No.: 17/466,993

(22) Filed: Sep. 3, 2021

(65) Prior Publication Data

US 2023/0076156 A1 Mar. 9, 2023

(51) Int. Cl.
| | |
|---|---|
| *H04L 29/06* | (2006.01) |
| *H04K 3/00* | (2006.01) |
| *H04L 9/40* | (2022.01) |
| *H04W 72/0446* | (2023.01) |
| *H04W 72/20* | (2023.01) |

(52) U.S. Cl.
CPC ............ *H04L 63/20* (2013.01); *H04K 3/41* (2013.01); *H04W 72/0446* (2013.01); *H04W 72/20* (2023.01)

(58) Field of Classification Search
CPC ..... H04L 63/20; H04L 63/1475; H04L 63/16; H04K 3/41; H04K 1/02; H04K 2203/16; H04K 3/825; H04W 72/0446; H04W 72/20; H04W 12/037; H04W 12/122
See application file for complete search history.

(56) References Cited

U.S. PATENT DOCUMENTS

2014/0153723 A1* 6/2014 McLaughlin ....... H04W 12/033
380/270
2015/0188662 A1* 7/2015 Shapira .................... H04K 3/43
455/1

(Continued)

FOREIGN PATENT DOCUMENTS

WO WO-2021063470 A1 4/2021

OTHER PUBLICATIONS

International Search Report and Written Opinion—PCT/US2022/075145—ISA/EPO—Dec. 2, 2022.

*Primary Examiner* — William A Corum, Jr.
(74) *Attorney, Agent, or Firm* — Holland & Hart LLP

(57) ABSTRACT

Methods, systems, and devices for wireless communications are described. In some wireless communications systems, a user equipment (UE) may receive, from a base station, control signaling identifying a configuration of a set of time intervals for communication with the base station, the set of time intervals including a subset of the time intervals for which the UE is to perform a physical layer security procedure. In some cases, the UE may activate a timer associated with performing the physical layer security procedure in response to a trigger. The UE and the base station may communicate one or more messages using the physical layer security procedure, for example, in the subset of the time intervals identified by the control signaling, while the timer is active, or both. The physical layer security procedure may involve the UE performing physical layer security encoding, signal jamming, or both.

30 Claims, 18 Drawing Sheets

(56) References Cited

U.S. PATENT DOCUMENTS

| | | | | |
|---|---|---|---|---|
| 2019/0181974 | A1* | 6/2019 | Ju | H04K 3/43 |
| 2021/0013986 | A1* | 1/2021 | Shaham | H04B 7/0617 |
| 2022/0338002 | A1* | 10/2022 | Laddu | H04L 9/0875 |
| 2022/0360412 | A1* | 11/2022 | Laddu | H04L 1/0006 |
| 2022/0394463 | A1* | 12/2022 | Fellhauer | H04K 3/825 |
| 2023/0318780 | A1* | 10/2023 | Yapici | H04L 5/006 |
| | | | | 370/252 |

* cited by examiner

PHYSICAL LAYER SECURITY ACTIVATION

FIELD OF TECHNOLOGY

The present disclosure relates to wireless communications, including physical layer security activation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless devices may use encryption techniques to protect communications from other devices. For example, a first wireless device may encrypt information in a message using a specific encryption protocol, encryption key, or both. To successfully receive the information, a second wireless device may identify the specific encryption protocol, encryption key, or both used and may decrypt the message accordingly. Other wireless devices unaware of the encryption protocol, the encryption key, or both may fail to decrypt the information (e.g., even if the other wireless devices receive the message). However, encryption may involve significant processing at higher layers for both encoding and decoding wireless devices, potentially increasing the latency involved in wireless communications. Additionally, in some examples, malicious devices may intercept messages and decrypt the information using computationally complex methods (e.g., by testing a significant quantity of encryption schemes, by detecting or otherwise identifying an encryption key to use, or both). Accordingly, in some cases, securing messages using encryption may be insufficient or may result in increased latency, processing overhead, or both.

SUMMARY

The described techniques relate to improved methods, systems, devices, and apparatuses that support physical layer security activation. Generally, the described techniques provide for a user equipment (UE) to improve wireless communications security using physical layer security techniques (e.g., in addition or alternative to other security techniques, such as encryption). The UE may receive control signaling (e.g., from a base station) identifying a configuration of a set of time intervals for communication with the base station, where the set of time intervals may include a subset of time intervals (e.g., secrecy intervals) for which the UE is to perform a physical layer security procedure. For example, the configuration may enable the UE to perform the physical layer security procedure in some time intervals and refrain from performing the physical layer security procedure in some other time intervals. In some cases, the UE may activate a timer for physical layer security, and the subset of time intervals configured for physical layer security may correspond to an active time for the timer. In some examples, the control signaling may include radio resource control (RRC) signaling, downlink control information (DCI) signaling, medium access control (MAC) control element (MAC-CE) signaling, or a combination thereof. The UE and the base station may communicate, in the subset of the time intervals identified by the control signaling, one or more messages using the physical layer security procedure. For example, the UE, the base station, or both may transmit a jamming signal concurrent to wireless communications to provide physical layer security, perform physical layer security encoding on wireless communications, or both during the subset of the time intervals.

A method for wireless communications at a UE is described. The method may include receiving, from a base station, control signaling identifying a configuration of a set of time intervals for communication with the base station, the set of time intervals including a subset of the time intervals for which the UE is to perform a physical layer security procedure and communicating, in the subset of the time intervals identified by the received control signaling, one or more messages using the physical layer security procedure.

An apparatus for wireless communications at a UE is described. The apparatus may include a processor, memory coupled with the processor, and instructions stored in the memory. The instructions may be executable by the processor to cause the apparatus to receive, from a base station, control signaling identifying a configuration of a set of time intervals for communication with the base station, the set of time intervals including a subset of the time intervals for which the UE is to perform a physical layer security procedure and communicate, in the subset of the time intervals identified by the received control signaling, one or more messages using the physical layer security procedure.

Another apparatus for wireless communications at a UE is described. The apparatus may include means for receiving, from a base station, control signaling identifying a configuration of a set of time intervals for communication with the base station, the set of time intervals including a subset of the time intervals for which the UE is to perform a physical layer security procedure and means for communicating, in the subset of the time intervals identified by the received control signaling, one or more messages using the physical layer security procedure.

A non-transitory computer-readable medium storing code for wireless communications at a UE is described. The code may include instructions executable by a processor to receive, from a base station, control signaling identifying a configuration of a set of time intervals for communication with the base station, the set of time intervals including a subset of the time intervals for which the UE is to perform a physical layer security procedure and communicate, in the subset of the time intervals identified by the received control signaling, one or more messages using the physical layer security procedure.

In some examples of the method, apparatuses, and non-transitory computer-readable medium described herein, communicating the one or more messages in the subset of the time intervals using the physical layer security procedure may include operations, features, means, or instructions for transmitting a jamming signal concurrent to communicating at least a portion of the one or more messages.

In some examples of the method, apparatuses, and non-transitory computer-readable medium described herein, communicating the one or more messages in the subset of the time intervals using the physical layer security procedure may include operations, features, means, or instructions for encoding the one or more messages with a set of pseudo-random bits based on a channel capacity for a channel and transmitting the encoded one or more messages on the channel.

In some examples of the method, apparatuses, and non-transitory computer-readable medium described herein, communicating the one or more messages in the subset of the time intervals using the physical layer security procedure may include operations, features, means, or instructions for receiving the one or more messages encoded with a set of pseudo-random bits on a channel and decoding the one or more messages from the set of pseudo-random bits based on a channel capacity of the channel.

Some examples of the method, apparatuses, and non-transitory computer-readable medium described herein may further include operations, features, means, or instructions for activating the physical layer security procedure in response to receiving the control signaling.

Some examples of the method, apparatuses, and non-transitory computer-readable medium described herein may further include operations, features, means, or instructions for determining to perform the physical layer security procedure within the subset of the time intervals for at least uplink, or downlink, or both, based on the control signaling indicating one or more directions, where communicating the one or more messages in the subset of the time intervals using the physical layer security procedure may be further based on the one or more messages corresponding to at least one of the indicated one or more directions.

Some examples of the method, apparatuses, and non-transitory computer-readable medium described herein may further include operations, features, means, or instructions for determining, from the set of time intervals, at least a set of symbols, or a set of slots, or a set of subframes, or a combination thereof configured for the physical layer security procedure based on the control signaling.

In some examples of the method, apparatuses, and non-transitory computer-readable medium described herein, the control signaling includes a bitmap indicating at least the set of symbols, or the set of slots, or the set of subframes, or the combination thereof configured for the physical layer security procedure, the determining based on the bitmap.

In some examples of the method, apparatuses, and non-transitory computer-readable medium described herein, the control signaling indicates at least a granularity of time resources configured for performing the physical layer security procedure, or a pattern of the time resources configured for performing the physical layer security procedure, or both, and where the subset of the time intervals corresponds to at least the granularity, or the pattern, or both.

In some examples of the method, apparatuses, and non-transitory computer-readable medium described herein, the control signaling indicates at least a start time for the subset of the time intervals, or a length for the subset of the time intervals, or both.

Some examples of the method, apparatuses, and non-transitory computer-readable medium described herein may further include operations, features, means, or instructions for transmitting, to the base station, a UE capability message indicating a full-duplex capability of the UE, where receiving the control signaling configuring the UE to perform the physical layer security procedure may be at least in part in response to the UE capability message indicating the full-duplex capability of the UE.

In some examples of the method, apparatuses, and non-transitory computer-readable medium described herein, the control signaling includes at least RRC signaling, or DCI signaling, or MAC-CE signaling, or a combination thereof.

Some examples of the method, apparatuses, and non-transitory computer-readable medium described herein may further include operations, features, means, or instructions for activating a timer associated with performing the physical layer security procedure in response to a trigger and communicating using the physical layer security procedure based on the timer being active.

Some examples of the method, apparatuses, and non-transitory computer-readable medium described herein may further include operations, features, means, or instructions for receiving, from a base station, additional control signaling configuring at least the timer, or an active length for the timer, or the trigger for activating the timer, or a combination thereof.

In some examples of the method, apparatuses, and non-transitory computer-readable medium described herein, the control signaling activates the timer, where the trigger for activating the timer corresponds to receiving the control signaling.

Some examples of the method, apparatuses, and non-transitory computer-readable medium described herein may further include operations, features, means, or instructions for adding first data to be communicated using the physical layer security procedure to a first buffer, where the trigger for activating the timer corresponds to a quantity of data in the first buffer satisfying a threshold quantity and adding second data to be communicated without the physical layer security procedure to a second buffer different from the first buffer.

Some examples of the method, apparatuses, and non-transitory computer-readable medium described herein may further include operations, features, means, or instructions for scheduling transmission of the one or more messages based on the timer being active and the one or more messages including information corresponding to a security level satisfying a threshold security level, where communicating the one or more messages using the physical layer security procedure may be further based on the scheduling.

Some examples of the method, apparatuses, and non-transitory computer-readable medium described herein may further include operations, features, means, or instructions for detecting the trigger for activating the timer based on at least a MAC layer operation, or a packet data convergence protocol (PDCP) layer operation, or an application (APP) layer operation, or a combination thereof.

A method for wireless communications at a base station is described. The method may include transmitting, to a UE, control signaling identifying a configuration of a set of time intervals for communication with the base station, the set of time intervals including a subset of the time intervals for which the UE is to perform a physical layer security procedure and communicating, in the subset of the time intervals identified by the transmitted control signaling, one or more messages using the physical layer security procedure.

An apparatus for wireless communications at a base station is described. The apparatus may include a processor, memory coupled with the processor, and instructions stored in the memory. The instructions may be executable by the processor to cause the apparatus to transmit, to a UE, control signaling identifying a configuration of a set of time intervals for communication with the base station, the set of time intervals including a subset of the time intervals for which the UE is to perform a physical layer security procedure and communicate, in the subset of the time intervals identified by the transmitted control signaling, one or more messages using the physical layer security procedure.

Another apparatus for wireless communications at a base station is described. The apparatus may include means for transmitting, to a UE, control signaling identifying a configuration of a set of time intervals for communication with the base station, the set of time intervals including a subset of the time intervals for which the UE is to perform a physical layer security procedure and means for communicating, in the subset of the time intervals identified by the transmitted control signaling, one or more messages using the physical layer security procedure.

A non-transitory computer-readable medium storing code for wireless communications at a base station is described. The code may include instructions executable by a processor to transmit, to a UE, control signaling identifying a configuration of a set of time intervals for communication with the base station, the set of time intervals including a subset of the time intervals for which the UE is to perform a physical layer security procedure and communicate, in the subset of the time intervals identified by the transmitted control signaling, one or more messages using the physical layer security procedure.

In some examples of the method, apparatuses, and non-transitory computer-readable medium described herein, communicating the one or more messages in the subset of the time intervals using the physical layer security procedure may include operations, features, means, or instructions for encoding the one or more messages with a set of pseudo-random bits based on a channel capacity for a channel and transmitting the encoded one or more messages on the channel.

In some examples of the method, apparatuses, and non-transitory computer-readable medium described herein, communicating the one or more messages in the subset of the time intervals based on configuring the UE to perform the physical layer security procedure may include operations, features, means, or instructions for receiving the one or more messages encoded with a set of pseudo-random bits on a channel and decoding the one or more messages from the set of pseudo-random bits based on a channel capacity of the channel.

Some examples of the method, apparatuses, and non-transitory computer-readable medium described herein may further include operations, features, means, or instructions for transmitting, to a second UE different from the UE, a jamming signal concurrent to communicating at least a portion of the one or more messages based on the physical layer security procedure.

DETAILED DESCRIPTION

Figure 1:
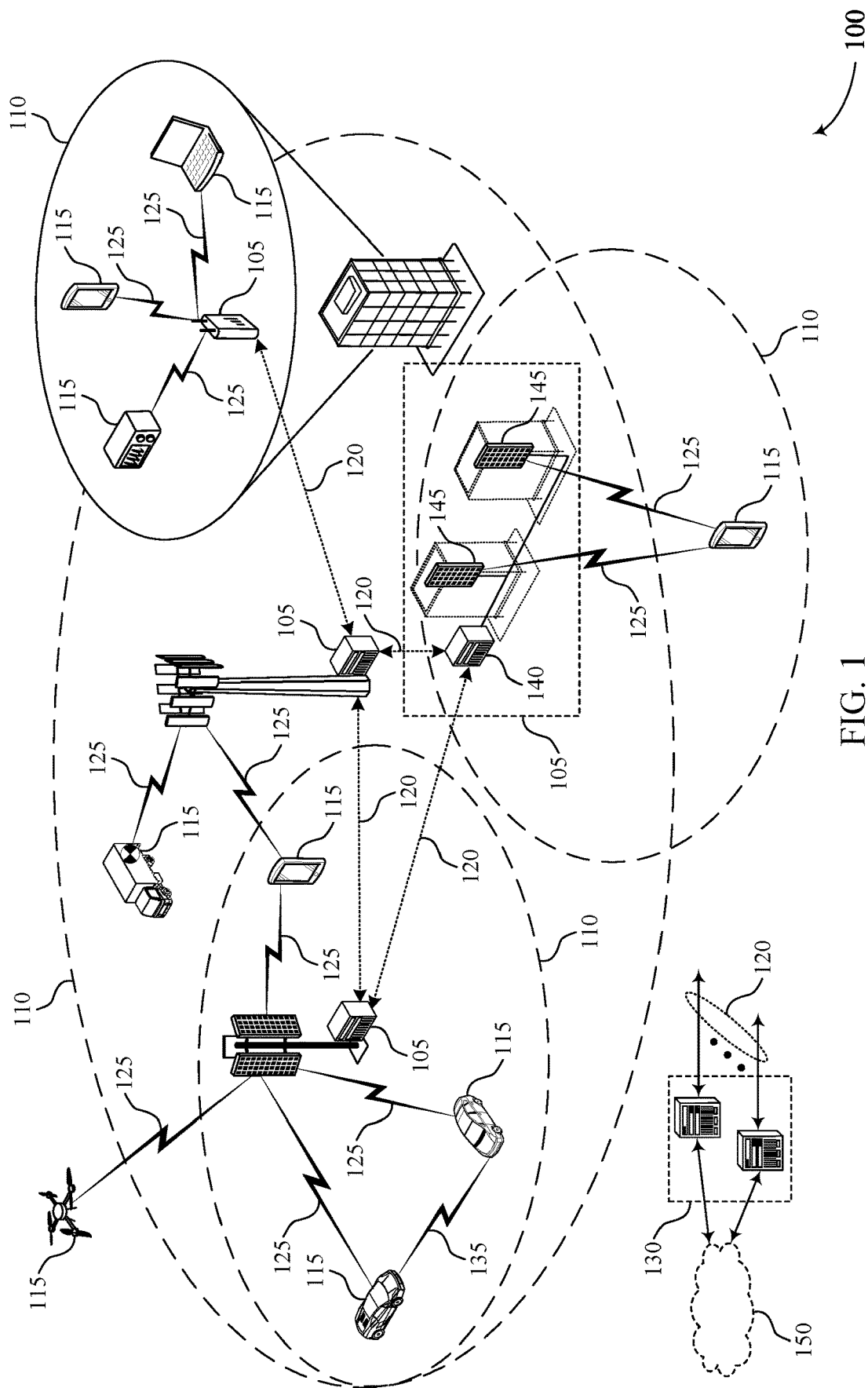
FIGS. 1 through 3 illustrate examples of wireless communications systems that support physical layer security activation in accordance with aspects of the present disclosure.

A wireless communications system may include one or more base stations, one or more network access nodes, or a combination thereof each concurrently supporting communications for multiple communication devices, which may be otherwise known as user equipment (UE). In some examples, a communication device (e.g., a base station, a UE) may support concurrent transmission and reception as part of a full-duplex mode or full-duplex communications. A UE may communicate messages with a base station on an uplink channel, a downlink channel, or both. In some cases, an adverse wireless communication device (e.g., an adverse UE) may be geographically located near (e.g., in relatively close proximity to) the UE communicating with the base station. The adverse wireless communication device may receive one or more communications (e.g., detecting the signaling) between the UE and the base station and may learn information about the UE, the base station, the signal contents, or other information from the communications, thereby infiltrating the wireless communications and potentially placing the UE at risk. Some UEs and base stations may use encryption to secure wireless communications. However, encryption may involve a relatively high processing overhead and may potentially be bypassed using computationally complex methods by some adverse wireless communication devices. As such, additional or alternative security techniques may be desired to improve wireless communication security, reduce processing overhead, or both.

As described herein, a UE may use physical layer security activation techniques to improve wireless communication security in an efficient manner. Physical layer security involves performing one or more techniques to reduce the likelihood that an adverse wireless communication device may detect a message communicated over a channel. For example, if a UE is a full-duplex device (e.g., capable of concurrent transmission and reception), the UE may transmit a jamming signal concurrent to receiving a message, such that the jamming signal interferes with an adverse wireless communication device's ability to detect and receive the message. Additionally or alternatively, a UE or base station may encode a message based on a physical channel metric such that an adverse wireless communication device may fail to differentiate the message from random noise. To activate such physical layer security techniques, the UE may receive control signaling from a base station identifying a configuration of a set of time intervals for communication with the base station, where the set of time intervals may include a subset of time intervals (e.g., secrecy intervals) for which the UE is to perform a physical layer security procedure. For example, the configuration may enable the UE to perform the physical layer security procedure in some time intervals and refrain from performing the physical layer security procedure in some other time intervals for improved processing efficiency. In some examples, the control signaling may include radio resource control (RRC) signaling, downlink control information (DCI) signaling, medium access control (MAC) control element (MAC-CE) signaling, or a combination thereof. The UE and the base station may communicate, in the subset of the time intervals identified by the control signaling, one or more messages using one or more physical layer security procedures.

In some examples, the UE may receive DCI which may indicate the direction of communications to be secured. For example, the DCI may indicate that downlink scheduling, an uplink grant, or both may be configured for physical layer security. In some cases, the UE may activate a timer associated with performing the physical layer security procedure in response to a trigger. For example, the UE may receive control signaling from the base station configuring the timer, an active length for the timer, a trigger for activating the timer, or a combination thereof. In some cases, the UE may communicate the one or more messages using the physical layer security procedure based on the timer being active.

The control signaling may support a UE activating physical layer security for specific time intervals (e.g., secrecy intervals) to improve communication security while refraining from performing physical layer security for other time intervals to reduce processing overhead. By using secrecy intervals, the UE may improve time and resource efficiency and may decrease power consumption. Additionally, the UE may communicate relatively high-priority or relatively high-security information within the secrecy intervals to improve the security of the information. In some examples, the UE may use physical layer security in addition to encryption to provide multiple types of security for wireless communications, significantly reducing the likelihood that an adverse wireless communication device may successfully detect, receive, decode, and decrypt the wireless communications. As such, techniques described herein may support improved network operations and, in some examples, may promote network efficiencies, among other benefits.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to physical layer security activation.

FIG. 1 illustrates an example of a wireless communications system 100 that supports physical layer security activation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may include one or more UEs 115 configured to operate in a full-duplex mode. A UE 115 configured to operate in the full-duplex mode may be able to both transmit and receive signals within a same time interval (e.g., within a same frame, subframe, slot, or symbol). A UE 115 that operates in the full-duplex mode may use in-band full-duplex (IBFD), sub-band full-duplex (SBFD), or a combination thereof. A UE 115 that supports IBFD may transmit and receive on same time and frequency resources. Additionally or alternatively, a UE 115 that supports SBFD may transmit and receive on same time resources but on different frequency resources. The wireless communications system 100 may also include one or more base stations 105 configured to operate in a full-duplex mode. In some examples, base stations 105 configured to operate in the full-duplex mode may include at least two panels, where one panel may be used for transmitting and another panel may be used for receiving, which may allow for concurrent transmitting and receiving operations.

Based on being configured to operate in the full-duplex mode, the UE 115 (e.g., a full-duplex device) may encounter self-interference (e.g., transmitting signaling in a first transmission direction may affect an ability of the UE 115 to successfully receive signaling in a second transmission direction at a same time). In some cases, the UE 115 may use one or more interference cancellation techniques for self-interference mitigation. For example, the UE 115 may achieve improved isolation of the self-interference (e.g., greater than 50 decibels (dB)) based on using separate antennas or antenna ports for concurrent transmission and reception operations. Additionally or alternatively, for SBFD operations (e.g., for greater than 40 dB isolation), the UE 115 may communicate such that different transmission directions occur in different portions of a frequency band, may use a guard band that exists between the different transmission directions, may use receiver windowed overlap-and-add (WOLA) processing to reduce an adjacent channel leakage ratio (ACLR) leakage to an uplink signal, may use an analog low-pass filter (LPF) to improve an analog-to-digital converter (ADC) dynamic range, may improve receiver automatic gain control (AGC) states to improve a noise figure (NF), or a combination thereof to aid in mitigating self-interference. Additionally or alternatively, for a digital integrated circuit (IC) of an ACLR leakage (e.g., for greater than 20 dB isolation), the UE 115 may use a non-linear model per each transmission-reception pair to aid in mitigating self-interference.

In some cases, the UE 115 may transmit uplink transmissions and receive downlink transmissions using a fully overlapping IBFD resource allocation. For example, a base station 105 may allocate downlink resources and uplink resources for a UE 115 in overlapping frequency resources (e.g., the uplink resources may be fully contained within the downlink resources). In some examples, the downlink resources and the uplink resources may overlap such that the UE 115 may transmit and receive on the same time and frequency resources. In some cases, the UE 115 may receive an indication that the downlink resources carry a downlink transmission that overlaps in time with an uplink transmission on the uplink resources to the base station 105. Accordingly, the UE 115 may determine that the downlink transmissions are to be received in a high-interference environment and may decode the downlink transmission accordingly.

In some examples, a UE 115 may transmit and receive using a partially overlapping IBFD resource allocation. For example, a base station 105 may allocate downlink resources and uplink resources for a UE 115 in partially overlapping time and frequency resources, such that the UE 115 and the base station 105 may transmit and receive on at least an overlapping portion of time and frequency resources. In some cases, other portions of the downlink resources and the uplink resources may not overlap in time or frequency, or both. In some examples, the UE 115 may transmit and receive using an SBFD resource allocation. For example, a base station 105 may allocate downlink resources and uplink resources for a UE 115 in separate frequency resources that occur during a same time period, such that the UE 115 and the base station 105 may transmit and receive over overlapping time resources and different frequency resources on the same radio frequency spectrum band. In some examples, the downlink resources and the uplink resources may be separated in frequency by a guard band. The guard band may be, for example, one or a few RBs (e.g., five RBs) separating the downlink resources and the uplink resources in the frequency domain.

As described herein, a UE 115 may achieve directional physical layer security based on utilizing full-duplex communications. For example, using the techniques described herein, the UE 115 may assist in securing a received signal by concurrently transmitting jamming (e.g., a set of arbitrary bits) in one or more directions—such as in the direction of an adverse wireless communication device (e.g., an adverse UE)—while also filtering its own self-interference. In some cases, the adverse wireless communication device may be geographically located near (e.g., in relatively close proximity to) the UE 115 receiving downlink transmissions. The adverse wireless communication device may monitor for communications not intended for the adverse wireless communication device (e.g., an uplink transmission from the UE 115 or a downlink transmission to the UE 115) to receive information about the UE 115, the base station 105, or both. Accordingly, a base station 105 transmitting a downlink transmission may detect that the adverse wireless communication device (e.g., a possible attacker) is near the UE 115 and may indicate for the UE 115 to transmit the jamming signal in the direction of the adverse wireless communication device based on detecting that the adverse wireless communication device is near the UE 115. Additionally or alternatively, the UE 115 may detect the presence of the adverse wireless communication device and may transmit the jamming signal in the direction of the detected device. In some other cases, the UE 115 may perform omni-directional jamming or may perform jamming in one or more pseudo-random directions (e.g., to perform physical layer security if no adverse wireless communication device is detected or based on detecting multiple potential adverse wireless communication devices).

In some cases, to prevent unwanted wireless communications devices from accessing transmissions, a UE 115 may use physical layer security, encryption, or both. Physical layer security may involve jamming, physical layer security encoding, or both. A physical layer security procedure may involve a UE 115, a base station 105, or both filling a channel capacity of a potential attacker (e.g., an adverse wireless communication device) with pseudo-random information, such as arbitrary bits (e.g., bits intended to hide another message, as opposed to bits intended to carry some meaning or value), so that the potential attacker fails to detect a message (e.g., information bits) communicated on the channel. In some examples, the UE 115, the base station 105, or both may perform jamming by transmitting a separate signal (e.g., a signal representing pseudo-random bits) in the direction of a potential attacker (e.g., an adverse wireless communication device) to cause interference at the potential attacker and reduce the likelihood that the potential attacker may detect a message communicated concurrent to the jamming. Additionally or alternatively, the UE 115, the base station 105, or both may use physical layer security encoding of the message to be communicated. For example, the UE 115, the base station 105, or both may transmit the message with a code rate that fills the channel capacity of the potential attacker such that the potential attacker fails to detect any useful information from the transmitter (e.g., information corresponding to a message). That is, physical layer security may include a physical layer procedure that uses the statistics of a channel to hide information within noise on the channel (e.g., instead of relying on security keys, like encryption).

In contrast, encryption may involve obfuscating the data within a message by encrypting the data using one or more security keys. However, encryption may involve increased computational power and system latency compared to physical layer security (e.g., because encryption may involve additional processing in higher layers at both an encrypting device and a decrypting device, which may potentially result in increased latency as compared to physical layer security).

During wireless communications between wireless devices (e.g., between a UE 115 and a base station 105) on a channel, an adverse wireless communication device (e.g., another UE 115) may attempt to monitor the channel, detect communications, and decode the communications to intercept information (e.g., confidential information). In some cases, encryption may fail to prevent the adverse wireless communication device from determining the information sent over the channel if the adverse wireless communication device is computationally capable (e.g., capable of decrypting the communications using one or more techniques). To more efficiently and effectively prevent unwanted wireless communication devices from determining information in wireless communications, the UE 115, the base station 105, or both may use physical layer security that prevents such unwanted wireless communication devices (e.g., such as an adverse wireless communication device) from detecting communications on the channel.

A UE 115 may leverage full-duplex communications to send information, such as a jamming signal (e.g., a set of arbitrary bits), in the direction of a nearby adverse wireless communication device on overlapping time resources—and, in some cases, overlapping frequency resources—used for communicating a message with a base station 105, thereby causing interference to the adverse wireless communication device and decreasing an ability of the adverse wireless communication device to detect the message. That is, the UE 115 may achieve directional physical layer security using jamming techniques based on utilizing full-duplex communications. In some cases, the UE 115 may be capable of receiving information (e.g., a downlink transmission from the base station 105) and transmitting jamming concurrently to provide physical layer security. However, providing physical layer security at all times may be inefficient and cause significant channel overhead.

As described herein, a UE 115 may receive control signaling (e.g., from a base station 105) identifying a configuration of a set of time intervals for communication with the base station 105, where the set of time intervals may include a subset of time intervals (e.g., secrecy intervals) for which the UE 115 is to perform a physical layer security procedure. For example, the configuration may enable the UE 115 to perform the physical layer security procedure in some time intervals and refrain from performing the physical layer security procedure in some other time intervals (e.g., to reduce processing overhead at the UE 115 and reduce the channel overhead caused by the physical layer security procedure). In some examples, the control signaling may include RRC signaling, DCI signaling, MAC-CE signaling, or a combination thereof. The UE 115 and the base station 105 may communicate, in the subset of the time intervals identified by the control signaling, one or more messages using the physical layer security procedure.

In some examples, the UE 115 may receive DCI which may indicate the direction of communications to be secured. For example, the DCI may indicate to perform the physical layer security procedure for uplink transmissions by the UE 115, downlink transmissions by the base station 105, or both. In some cases, the UE 115 may activate a timer associated with performing the physical layer security procedure in response to a trigger. For example, the UE 115 may receive control signaling from the base station 105 configuring the timer, an active length for the timer, a trigger for activating the timer, or a combination thereof. In some cases, the UE 115 may communicate the one or more messages using the physical layer security procedure based on the timer being active.

Figure 2:
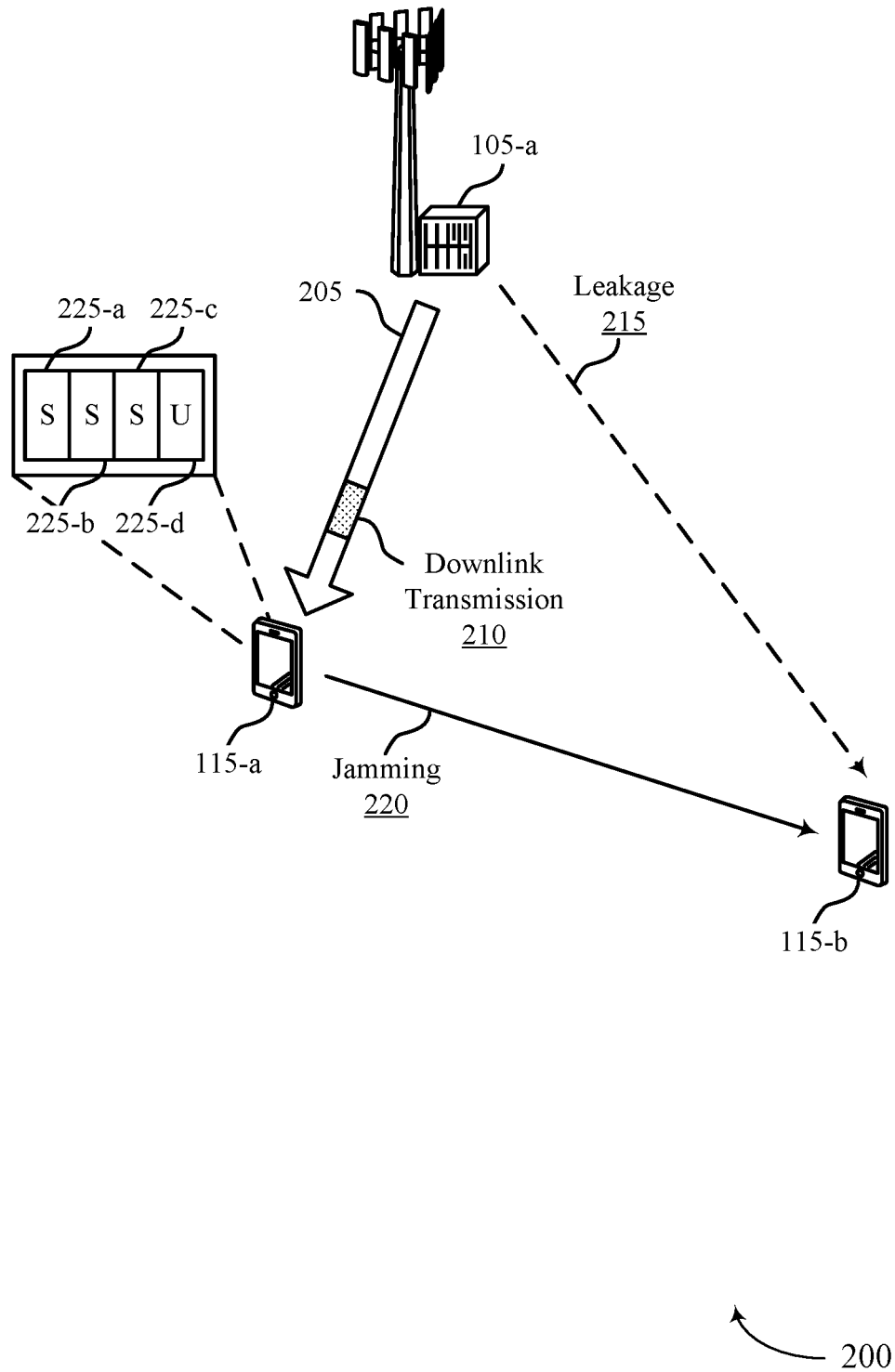

FIG. 2 illustrates an example of a wireless communications system 200 that supports physical layer security activation in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a, a UE 115-b, and a base station 105-a, which may be examples of corresponding devices described herein. In some examples, the UE 115-a, the UE 115-b, the base station 105-a, or a combination thereof may support half-duplex communications or full-duplex communications. While described with reference to the UE 115-a, the UE 115-b, and the base station 105-a, the techniques described herein may be performed by additional or alternative devices.

In some cases, the UE 115-b, which may be an example of an adverse wireless communication device, may be geographically located near (e.g., in relatively close proximity to) the UE 115-a, which may be a wireless communication device communicating with the base station 105-a. For example, the base station 105-a may transmit, and the UE 115-a may receive, a downlink transmission 210 via a downlink channel 205. In some cases, the UE 115-b may monitor the downlink channel 205 and detect the downlink transmission 210. For example, the UE 115-b may receive leakage 215 of signaling from the base station 105-a (e.g., due to the signal propagation in the spatial domain), which may allow the UE 115-b to receive and decode the downlink transmission 210. In some such cases, the UE 115-b may learn information about the UE 115-a (e.g., the intended target of the downlink transmission 210) or otherwise determining information included in the downlink transmission 210, thereby infiltrating the communications between the base station 105-a and the UE 115-a and placing the security of such communications at risk. Similarly, in some cases, the UE 115-b may attempt to detect information sent from the UE 115-a to the base station 105-a. As described herein, the UE 115-a, the base station 105-a, or both may use physical layer security techniques to prevent the UE 115-b from detecting and decoding the downlink transmission 210.

In some examples, the UE 115-a may leverage full-duplex communications to send a transmission, such as a jamming signal 220 (e.g., carrying a set of arbitrary bits, such as a pseudo-random set of bits), in the direction of the UE 115-b on overlapping time resources (and, in some cases, overlapping frequency resources) used for receiving the downlink transmission 210 from the base station 105-a. The jamming signal 220 may create channel overhead and interference for the UE 115-b, effectively decreasing an ability of the UE 115-b to detect and decode the downlink transmission 210 on the channel. That is, the UE 115-a may achieve directional physical layer security using jamming techniques based on the UE 115-a supporting full-duplex communications. The UE 115-a may assist in securing its own reception of signaling (i.e., the downlink transmission 210) by concurrently transmitting the jamming signal 220 (e.g., the set of arbitrary bits) towards the UE 115-b. Additionally, the UE 115-a may filter out self-interference from the jamming signal 220 to receive and decode the downlink transmission 210. In some examples, the UE 115-a may transmit the jamming signal 220 omni-directionally or using a beam sweeping procedure, for example, such that potential adverse wireless communication devices in multiple different directions may be affected by the jamming signal 220. The UE 115-a may be capable of receiving the downlink transmission 210 and transmitting the jamming signal 220 (e.g., a pseudo-random signal) concurrently based on the UE 115-a supporting full-duplex capabilities In some cases, the UE 115-a may transmit a UE capability message to the base station 105-a indicating the UE's ability to support a full-duplex mode and, correspondingly, support jamming.

The wireless communications system 200 may support techniques for physical layer security activation. For example, the UE 115-a may utilize different activation techniques to provide physical layer security within secrecy intervals. The UE 115-a may receive, from the base station 105-a, control signaling identifying a configuration of a set of time intervals for communication with the base station 105-a, where the set of time intervals may include a subset of time intervals (e.g., secrecy intervals) for which the UE 115-a is to perform a physical layer security procedure. That is, the configuration may enable the UE 115-a to perform the physical layer security procedure in some time intervals and refrain from performing the physical layer security procedure in some other time intervals. For example, the UE 115-a may be configured with a four time interval pattern, where the time intervals may correspond to symbols, slots, subframes, or the like. In some examples, the UE 115-a may operate according to the pattern on a repeat-basis. The pattern may indicate in which time intervals 225 the UE 115-a is to provide physical layer security for wireless communications. As an example, a time interval 225-a, a time interval 225-b, and a time interval 225-c may each be secured, while a time interval 225-d may be unsecured, such that the UE 115-a may perform the physical layer security procedure in the time interval 225-a, the time interval 225-b, and the time interval 225-c and may refrain from performing the physical layer security procedure in the time interval 225-d. The UE 115-a and the base station 105-a may communicate, in the subset of the time intervals identified by the control signaling (e.g., in the secrecy intervals), one or more messages using the physical layer security procedure. In some cases, the UE 115-a may transmit the jamming signal 220 concurrent to communicating at least a portion of the one or more messages with the base station 105-a in a time interval configured for physical layer security.

Figure 3:
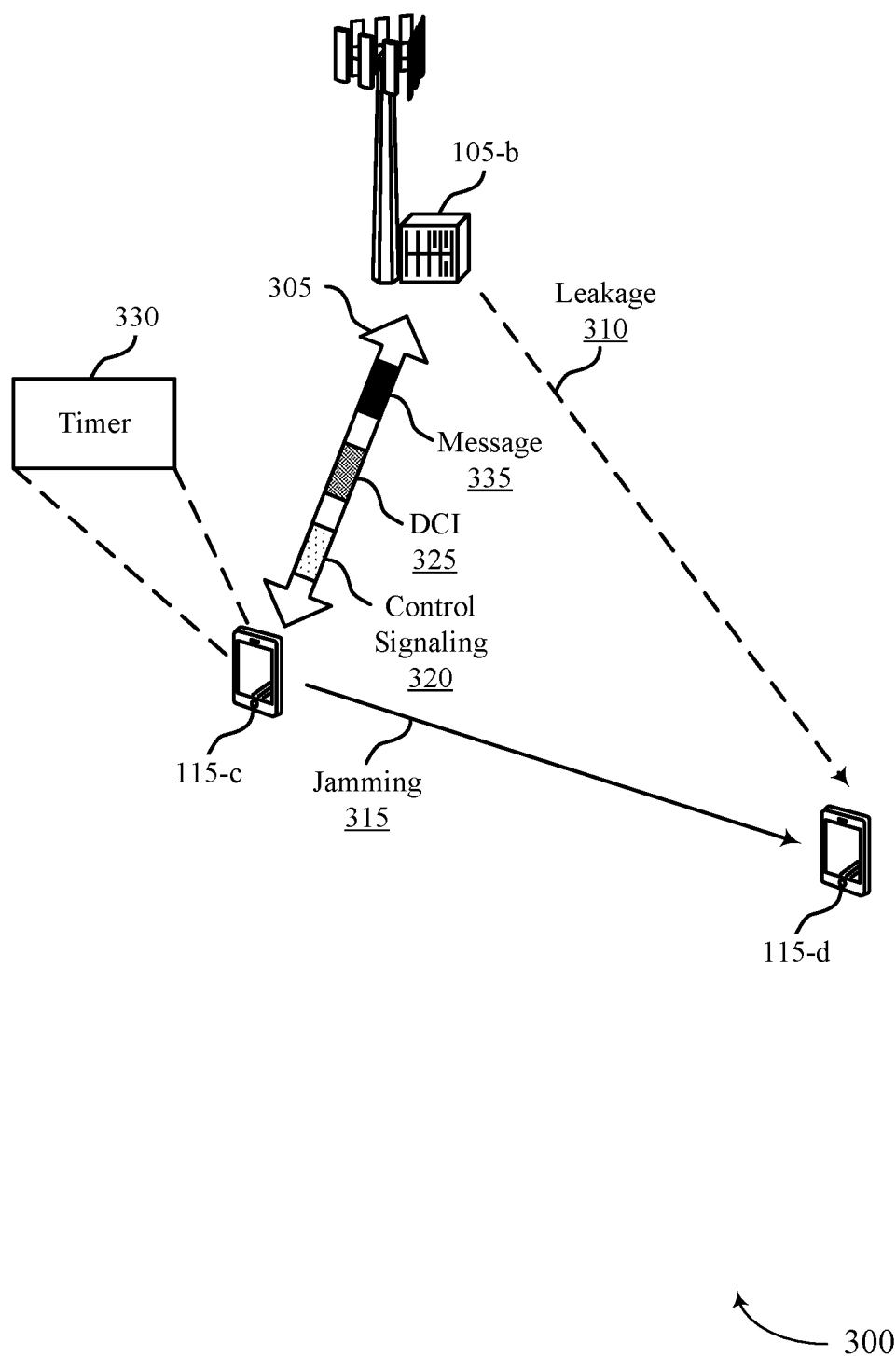

FIG. 3 illustrates an example of a wireless communications system 300 that supports physical layer security activation in accordance with aspects of the present disclosure. In some examples, the wireless communications system 300 may implement aspects of the wireless communications systems 100 and 200 or may be implemented by aspects of the wireless communications systems 100 and 200. For example, the wireless communications system 300 may include a UE 115-c, a UE 115-d, and a base station 105-b, which may be examples of corresponding devices described herein. The wireless communications system 300 may support the configuration of physical layer security time intervals for improved message security. While described with reference to the UE 115-c, the UE 115-d, and the base station 105-b, the techniques described herein may be performed by additional or alternative devices.

As described with reference to FIG. 2, the UE 115-c may leverage full-duplex capabilities to support physical layer security. In some cases, the UE 115-c may transmit, to the base station 105-b, a UE capability message indicating a full-duplex capability of the UE 115-c. The UE 115-c may use the full-duplex communications to send information, such as a jamming signal 315 (e.g., indicating a set of arbitrary, or pseudo-random, bits), concurrent to receiving a downlink transmission from the base station 105-b via a communications link 305. Similarly, the base station 105-b may send a jamming signal concurrent to receiving an uplink transmission from the UE 115-c via the communications link 305 to provide physical layer security for the uplink transmission. The jamming signal 315 may cause channel overhead and interference for the UE 115-d, effectively decreasing an ability of the UE 115-d to detect and decode communications between the UE 115-c and the base station 105-b (e.g., if the UE 115-d receives leakage 310 from the base station 105-b, the UE 115-c, or both due to the communications between the base station 105-b and the UE 115-c leaking into other directions in the spatial domain). That is, the UE 115-c, the base station 105-b, or both may achieve directional physical layer security using jamming techniques based on full-duplex communications.

The wireless communications system 300 may support techniques for physical layer security activation. For example, the UE 115-c may utilize different activation techniques to provide physical layer security within secrecy intervals. The UE 115-c may receive, from the base station 105-b, control signaling 320 identifying a configuration of secrecy intervals, during which the UE 115-c, the base station 105-b, or both are to perform a physical layer security procedure. The control signaling 320 may include RRC signaling, DCI signaling, MAC-CE signaling, or a combination thereof. For example, the base station 105-b may configure the UE 115-c with a secrecy configuration using RRC signaling. The base station 105-b may dynamically update the configuration (e.g., based on detecting a potential adversarial UE, such as the UE 115-d, based on identifying relatively high-security information for communication above a security threshold) using DCI signaling, a MAC-CE, or both. Additionally or alternatively, the base station 105-b may configure the UE 115-c with a set of secrecy interval patterns or configurations using RRC signaling and may indicate a specific active secrecy interval pattern or configuration using DCI signaling, a MAC-CE, or both.

In some examples, the UE 115-c may determine a set of symbols, slots, subframes, or a combination thereof from the set of time intervals that may be configured for the physical layer security procedure based on the control signaling 320. As such, the UE 115-c, the base station 105-b, or both may perform the physical layer security procedure in symbols, slots, subframes, or any combination thereof which may provide secrecy according to the configuration and may refrain from performing the physical layer security procedure in other symbols, slots, or subframes that may lack the secrecy designation. For example, as described herein with reference to FIG. 2, the UE 115-c may be configured with a four slot pattern (e.g., [S, S, S, U]), where the first three slots may be secured (e.g., S) and the last slot may be unsecured (e.g., U). The UE 115-c, the base station 105-b, or both may activate one or more physical layer security techniques corresponding to the physical layer security procedure in the slots configured as "secured" slots. In some cases, the control signaling 320 (e.g., an RRC configuration) may provide the UE 115-c an indication of the granularity of the secrecy intervals (e.g., symbols, slots, subframes). For example, the control signaling 320 may indicate at least a granularity of time resources configured for performing the physical layer security procedure, or a pattern of the time resources configured for performing the physical layer security procedure, or both, where the subset of time intervals (e.g., the secrecy intervals) may correspond to at least the granularity, or the pattern, or both.

In some examples, the base station 105-b may use DCI to activate secrecy sessions. The UE 115-c may receive DCI 325 activating a secrecy session. In some examples, the DCI 325 may include a start indication and a length indication for the secrecy session. For example, the DCI 325 may include a bit field indicating a start time for the secrecy session (e.g., an absolute time, a relative time as compared to the time at reception of the DCI 325, a specific symbol, a specific slot), a bit field indicating a length for the secrecy session (e.g., a quantity of symbols, slots, milliseconds, seconds), or both. In some cases, the UE 115-c may use physical layer security for communications throughout the secrecy session. In some other cases, the UE 115-c may use a configured pattern of secrecy intervals (e.g., defined at the UE 115-c or configured via control signaling 320) during the secrecy session to determine whether to use physical layer security for a communication during the secrecy session. In some other examples, the DCI 325 may include a bitmap indicating the secrecy intervals (e.g., specific symbols, slots, or subframes configured for physical layer security operations). For example, the bit map may include a quantity of bits corresponding to a quantity of time intervals in a set of time intervals (e.g., in a pattern), and the value of each bit may indicate whether physical layer security is configured for that time interval (e.g., a bitmap [1, 1, 1, 0] may indicate [S, S, S, U] for a set of four time intervals). In some examples, the DCI 325 (e.g., a secrecy activation DCI) may additionally or alternatively indicate the direction of communications to be secured. For example, the DCI 325 may indicate that downlink scheduled transmissions may be secured using physical layer security during the secrecy session, uplink granted transmissions may be secured using physical layer security during the secrecy session, or both.

In some cases, the UE 115-c may utilize timer-based secrecy intervals. The UE 115-c may be configured with a timer 330, and upon activation of the timer 330, the UE 115-c may enter a secrecy session until the expiration of the timer 330. That is, the secrecy session may be configured for the duration of the timer 330. For example, the UE 115-c may receive the control signaling 320 identifying the configuration of the set of time intervals for communication with the base station 105-b, the set of time intervals including a subset of time intervals for which the UE 115-c is to perform a physical layer security procedure. The subset of time intervals may correspond to the secrecy session that may be activated by the timer 330. The UE 115-c may communicate the one or more messages using the physical layer security procedure in the subset of time intervals (e.g., while the timer 330 is active) and may refrain from using the physical layer security procedure in other time intervals of the set of time intervals (e.g., while the timer 330 is deactivated, for example, prior to activation or after expiry of the timer 330).

In some cases, the UE 115-c may communicate some data using physical layer security and some data without using physical layer security. The UE 115-c, the base station 105-b, or both may organize data based on whether the data is to be transmitted with physical layer security or not. For example, relatively high-security data (e.g., data satisfying a security threshold or an importance threshold) may be added to a first buffer for transmission using physical layer security (e.g., a secrecy buffer) and other data may be added to a second buffer for transmission. Using timer-based secrecy intervals, the UE 115-c may communicate the high-security data upon activating the timer 330 (e.g., the UE 115-c may communicate the high-security data while the timer 330 is active and physical layer security is configured). In some examples, the UE 115-c may trigger activating the timer based on having high-security data to send in the secrecy buffer, for example, instead of waiting to communicate the data in a secrecy interval configured by the base station 105-b. In some cases, the timer 330 may be activated via an RRC configuration, a MAC-CE, DCI, or another event trigger. For example, the timer 330 may be triggered if the buffer for secured transmissions is full (e.g., if a quantity of data in the buffer satisfies a threshold quantity). That is, the UE 115-c may add first data to be communicated using the physical layer security procedure to the first buffer and second data that may be communicated without physical layer security to the second buffer. In some cases, a higher layer within the UE 115-c (e.g., the MAC layer, the PDCP layer, the application (APP) layer) may trigger the physical layer to activate the timer 330 for physical layer security.

In some examples, using timer-based secrecy intervals, the UE 115-c may activate the timer 330 associated with performing the physical layer security procedure in response to a trigger, and the UE 115-c may communicate a message (e.g., the message 335) based on the timer 330 being active. That is, the UE 115-c may be pre-configured with the timer 330, and the UE 115-c may trigger the timer 330 internally (e.g., based on the message 335, based on an application at the UE 115-c). In some cases, for example, the UE 115-c may receive, from the base station 105-b, control signaling 320 configuring the timer 330, an active length of the timer 330, the trigger for activating the timer 330, or a combination thereof. The UE 115-c may use the configured timer to trigger physical layer security procedures.

Based on the control signaling 320, the DCI 325, or both, the UE 115-c may communicate one or more messages 335 with the base station 105-b in the subset of time intervals configured for physical layer security. In some cases, the UE 115-c may communicate the one or more messages 335 and concurrently transmit the jamming signal 315 (e.g., to the UE 115-d). In some cases, the UE 115-c may receive the one or more messages 335 with a set of pseudo-random bits on a channel, and the UE 115-c may decode the one or more messages 335 from the set of pseudo-random bits based on a channel capacity of the channel. Similarly, in some cases, the UE 115-c may encode the one or more messages 335 with a set of pseudo-random bits based on a channel capacity of the channel, and the UE 115-c may transmit the encoded one or more messages 335 on the channel.

In some examples, the UE 115-c may be in an active secrecy session (e.g., secrecy interval) for downlink scheduling (e.g., when a downlink transmission is scheduled from the base station 105-b). The UE 115-c may assume physical layer security encoding was performed by the base station 105-b, may perform jamming (e.g., transmit the jamming signal 315 to the UE 115-d), or both. For example, the UE 115-c may assume that the base station 105-b performs physical layer security encoding (e.g., encoding at the physical layer, superposition encoding), which may enable the UE 115-c to properly decode the downlink transmission. In some cases, for uplink scheduling, the UE 115-c may perform physical layer security encoding on uplink transmissions to the base station 105-b. Additionally or alternatively, the UE 115-c may perform jamming (e.g., transmit the jamming signal 315) to the UE 115-d concurrently with the uplink transmissions. In some examples, the UE 115-c may schedule transmission of the one or more messages 335 based on the timer 330 being active, the secrecy intervals, or both and the one or more messages 335 including information corresponding to a security level satisfying a threshold security level. In some cases, a UE 115-c (e.g., a half-duplex UE) may perform physical layer security encoding on uplink transmissions, but may refrain from performing jamming concurrent to receiving downlink transmissions.

Figure 4:
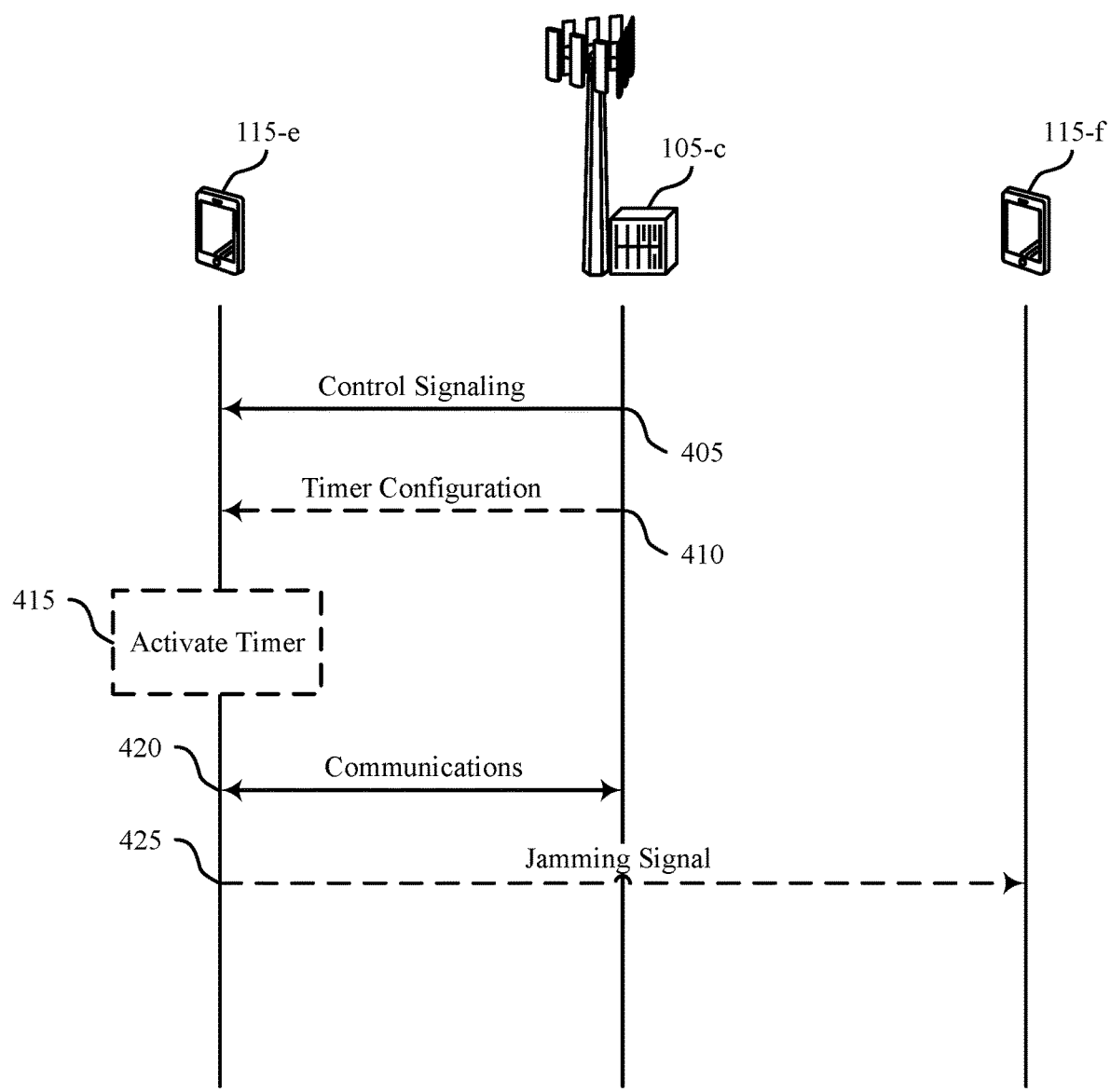
FIGS. 4 and 5 illustrate examples of process flows that support physical layer security activation in accordance with aspects of the present disclosure.

FIG. 4 illustrates an example of a process flow 400 that supports physical layer security activation in accordance with aspects of the present disclosure. The process flow 400 may implement aspects of the wireless communications systems 100, 200, and 300, or may be implemented by aspects of the wireless communications systems 100, 200, and 300. For example, the process flow 400 may illustrate operations between a UE 115-e, a UE 115-f, and a base station 105-c, which may be examples of corresponding devices described herein. In the following description of the process flow 400, the communications between the UE 115-e, the UE 115-f, and the base station 105-c may be performed in a different order than the example order shown, and the operations performed by the UE 115-e, the UE 115-f, and the base station 105-c may be performed in different orders or at different times. Some operations may be omitted from the process flow 400, and other operations may be added to the process flow 400.

At 405, the UE 115-e may receive, from the base station 105-c, control signaling identifying a configuration of a set of time intervals for communication with the base station 105-c, the set of time intervals including a subset of time intervals (e.g., secrecy intervals) for which the UE 115-e is to perform a physical layer security procedure. The subset of time intervals may be set of symbols, a set of slots, a set of subframes, or a combination thereof. For example, the UE 115-e may be configured with some subset of time intervals that may be secured using physical layer security and some other subset of time intervals without physical layer security. As such, the UE 115-e may communicate secure transmissions in the secure subset of time intervals and may communicate unsecure transmissions (e.g., transmissions that may use other forms of security, such as encryption, but do not use physical layer security) in the subset of time intervals without physical layer security. The control signaling may include RRC signaling, DCI signaling, MAC-CE signaling, or a combination thereof.

At 410, the UE 115-e may receive, from the base station 105-c, control signaling configuring at least a timer, or an active length for the timer, a trigger for activating the timer, or a combination thereof. In some cases, the UE 115-e may receive control signaling activating the timer, where the trigger for activating the timer may correspond to receiving the control signaling.

At 415, the UE 115-e may activate the timer associated with performing a physical layer security procedure in response to a trigger. In some examples, the UE 115-e may detect the trigger for activating the timer based on a MAC layer operation, a PDCP layer operation, an APP layer operation, or a combination thereof. In some examples, the UE 115-e may use the timer to communicate secured data with a relatively low latency (e.g., the UE 115-e may communicate the secured data for the duration of the timer) instead of waiting to communicate the secured data in a secrecy interval (e.g., a secured subset of time intervals) configured by the base station 105-c. For example, the UE 115-e may trigger activation of the timer based on having pending data to transmit that satisfies a security threshold, a latency threshold, or both (e.g., relatively high-priority, low-latency data).

At 420, the UE 115-e may communicate, with the base station 105-c, one or more messages in the subset of time intervals (e.g., the secrecy intervals) identified by the received control signaling using the physical layer security procedure. In some examples, the UE 115-e may communicate the one or more messages based on the timer being active. That is, in some cases, the timer may define the subset of time intervals (e.g., the subset of time intervals may correspond to the active time for the timer). In some examples, the UE 115-e may schedule transmission of a message based on the timer being active and the message including information corresponding to a security level satisfying a threshold security level.

At 425, the UE 115-e may transmit, to the UE 115-f, a jamming signal concurrent to communicating at least a portion of the one or more messages. For example, the UE 115-f may potentially be an example of an adverse wireless communication device. To prevent the UE 115-f from detecting and decoding transmissions between the UE 115-e and the base station 105-c, the UE 115-e may use physical layer security (e.g., the jamming signal), encryption, or both. The UE 115-e may transmit arbitrary information in the jamming signal such that the UE 115-f may fail to detect any useful information in communications between the UE 115-e and the base station 105-c.

Figure 5:
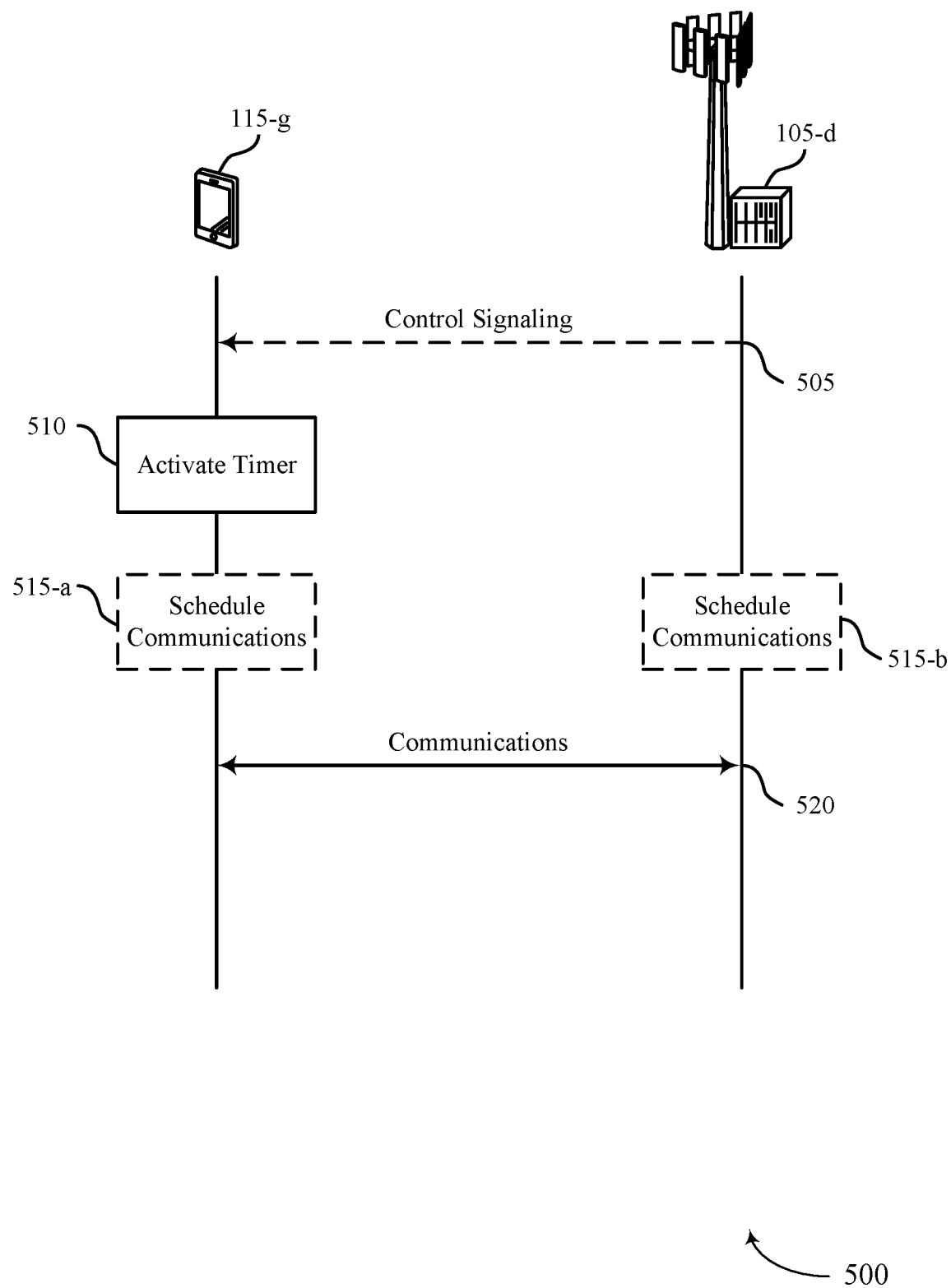

FIG. 5 illustrates an example of a process flow 500 that supports physical layer security activation in accordance with aspects of the present disclosure. The process flow 500 may implement aspects of the wireless communications systems 100, 200, and 300 or may be implemented by aspects of the wireless communications system 100, 200, and 300. For example, the process flow 500 may illustrate operations between a UE 115-g and a base station 105-d, which may be examples of corresponding devices described herein. In the following description of the process flow 500, the communications between the UE 115-g and the base station 105-d may be transmitted in a different order than the example order shown, or the operations performed by the UE 115-g and the base station 105-d may be performed in different orders or at different times. Some operations may be omitted from the process flow 500, and other operations may be added to the process flow 500.

At 505, the UE 115-g may receive, from the base station 105-d, control signaling configuring a timer associated with performing a physical layer security procedure in response to a trigger, or an active length for the timer, or a trigger for activating the timer, or a combination thereof. That is, the UE 115-g may be configured with a timer, which may be triggered by the UE 115-g. Alternatively, the UE 115-g may be pre-configured with a timer, where the active length for the timer, the trigger for activating the timer, or both may be defined for the UE 115-g. The timer may be an example of a physical layer security activation timer. That is, while the timer is active, the UE 115-g may perform one or more physical layer security techniques for wireless communications.

At 510, the UE 115-g may activate the timer associated with performing the physical layer security procedure in response to a trigger. In some cases, the UE 115-g may add first data to be communicated using the physical layer security procedure to a first buffer, where the trigger for activating the timer corresponds to a quantity of data in the first buffer satisfying a threshold quantity. The UE 115-g may add second data to be communicated without the physical layer security procedure to a second buffer different from the first buffer. In some examples, the UE 115-g may detect the trigger for activating the timer based on at least a MAC layer operation, or a PDCP layer operation, or an APP layer operation, or a combination thereof. In some other examples, the UE 115-g may receive, from the base station 105-d, control signaling activating the timer.

At 515-a, the UE 115-g may schedule transmission of a message based on the timer being active and the message including information corresponding to a security level satisfying a threshold security level. Additionally or alternatively, at 515-b, the base station 105-d may schedule transmission of a message (e.g., by the base station 105-*d* or the UE 115-*g*) based on the timer being active and the message including information corresponding to a security level satisfying a threshold security level. The message may be scheduled for transmission while the timer is active to provide physical layer security for the message.

At 520, the UE 115-*g* may communicate, with the base station 105-*d*, the message using the physical layer security procedure based on the timer being active. In some examples, the UE 115-*g* may communicate the message using the physical layer security procedure further based on one or more of the aforementioned triggers.

Figure 6:
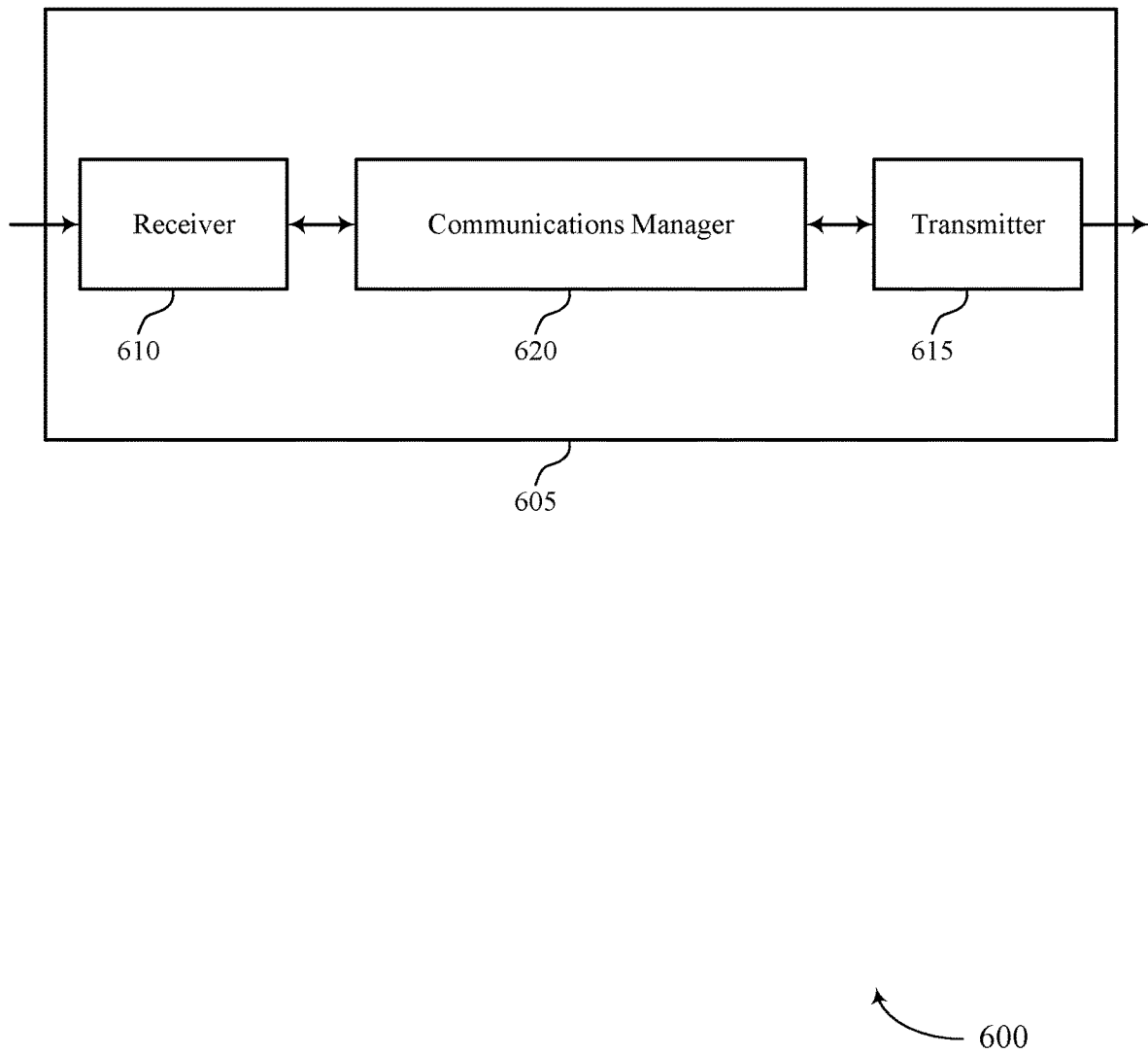
FIGS. 6 and 7 show block diagrams of devices that support physical layer security activation in accordance with aspects of the present disclosure.

FIG. 6 shows a block diagram 600 of a device 605 that supports physical layer security activation in accordance with aspects of the present disclosure. The device 605 may be an example of aspects of a UE 115 as described herein. The device 605 may include a receiver 610, a transmitter 615, and a communications manager 620. The device 605 may also include one or more processors, memory coupled with the one or more processors, and instructions stored in the memory that are executable by the one or more processors to enable the one or more processors to perform the physical layer security features discussed herein. Each of these components may be in communication with one another (e.g., via one or more buses).

The receiver 610 may provide a means for receiving information such as packets, user data, control information, or any combination thereof associated with various information channels (e.g., control channels, data channels, information channels related to physical layer security activation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to physical layer security activation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of physical layer security activation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, control signaling identifying a configuration of a set of time intervals for communication with the base station, the set of time intervals including a subset of the time intervals for which the UE is to perform a physical layer security procedure. The communications manager 620 may be configured as or otherwise support a means for communicating, in the subset of the time intervals identified by the received control signaling, one or more messages using the physical layer security procedure.

Additionally or alternatively, the communications manager 620 may support wireless communications at a UE in accordance with examples as disclosed herein. For example, the communications manager 620 may be configured as or otherwise support a means for activating a timer associated with performing a physical layer security procedure in response to a trigger. The communications manager 620 may be configured as or otherwise support a means for communicating a message using the physical layer security procedure based on the timer being active.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved security procedures. For example, the device 605 may perform physical layer security procedures using secrecy intervals, which may improve time and resource efficiency while decreasing power consumption. The device 605 may effectively reducing a number of times the processor ramps up processing power and turns on processing units to handle physical layer security techniques based on the configuration of secrecy intervals (e.g., a subset of a set of time intervals) and non-secrecy intervals. As such, supported techniques may include improved network operations and, in some examples, may promote network efficiencies, among other benefits.

Figure 7:
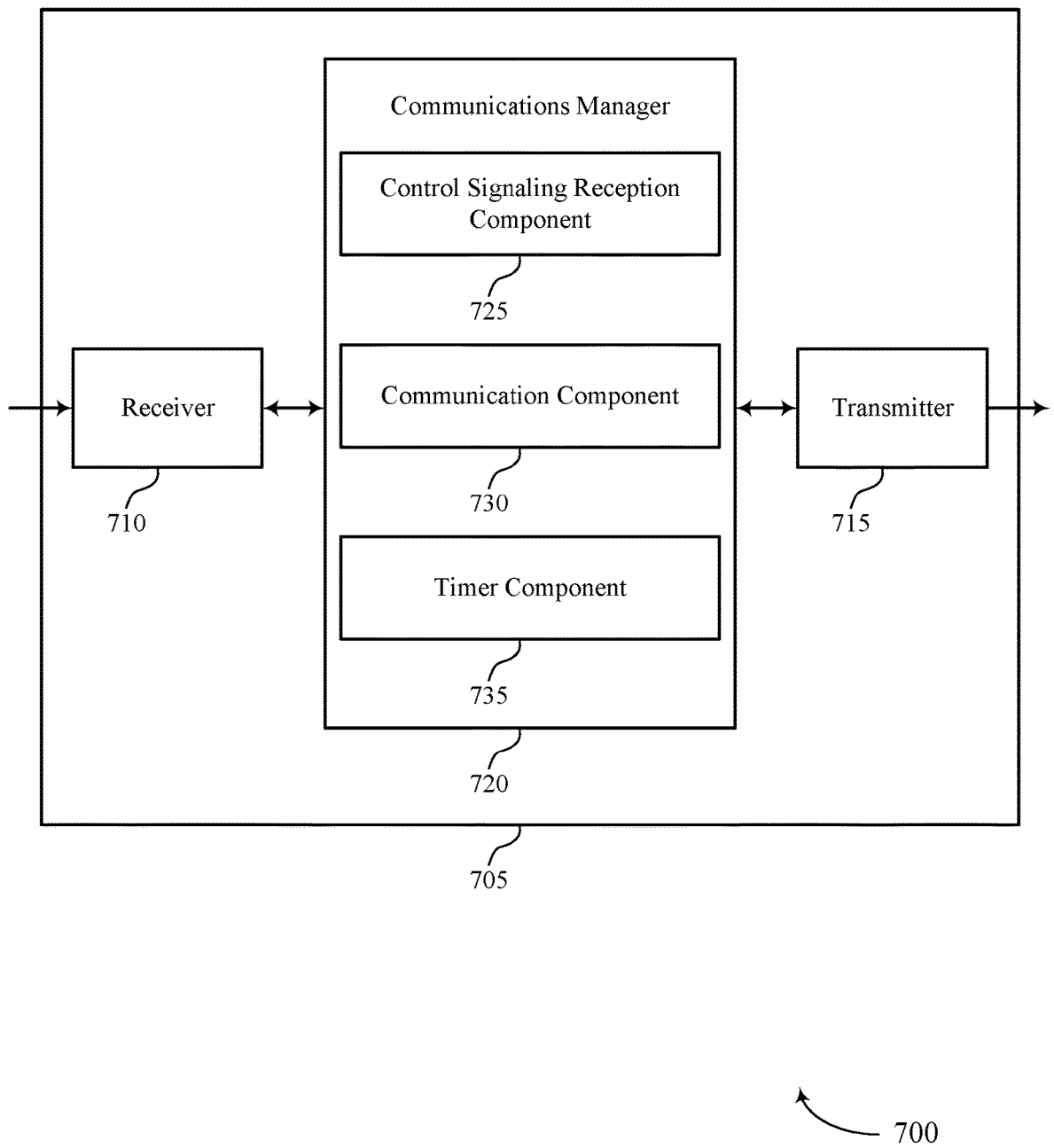

FIG. 7 shows a block diagram 700 of a device 705 that supports physical layer security activation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to physical layer security activation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to physical layer security activation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of physical layer security activation as described herein. For example, the communications manager 720 may include a control signaling reception component 725, a communication component 730, a timer component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The control signaling reception component 725 may be configured as or otherwise support a means for receiving, from a base station, control signaling identifying a configuration of a set of time intervals for communication with the base station, the set of time intervals including a subset of the time intervals for which the UE is to perform a physical layer security procedure. The communication component 730 may be configured as or otherwise support a means for communicating, in the subset of the time intervals identified by the received control signaling, one or more messages using the physical layer security procedure.

Additionally or alternatively, the communications manager 720 may support wireless communications at a UE in accordance with examples as disclosed herein. The timer component 735 may be configured as or otherwise support a means for activating a timer associated with performing a physical layer security procedure in response to a trigger. The communication component 730 may be configured as or otherwise support a means for communicating a message using the physical layer security procedure based on the timer being active.

In some cases, the control signaling reception component 725, the communication component 730, the timer component 735, or a combination thereof may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling reception component 725, the communication component 730, the timer component 735, or a combination thereof discussed herein. A transceiver processor may be collocated with a transceiver of the device, may communicate with (e.g., direct the operations of) a transceiver of the device, or both. A radio processor may be collocated with a radio (e.g., an NR radio, an LTE radio, a Wi-Fi radio) of the device, may communicate with (e.g., direct the operations of) a radio of the device, or both. A transmitter processor may be collocated with a transmitter of the device, may communicate with (e.g., direct the operations of) a transmitter of the device, or both. A receiver processor may be collocated with a receiver of the device, communicate with (e.g., direct the operations of) a receiver of the device, or both.

Figure 8:
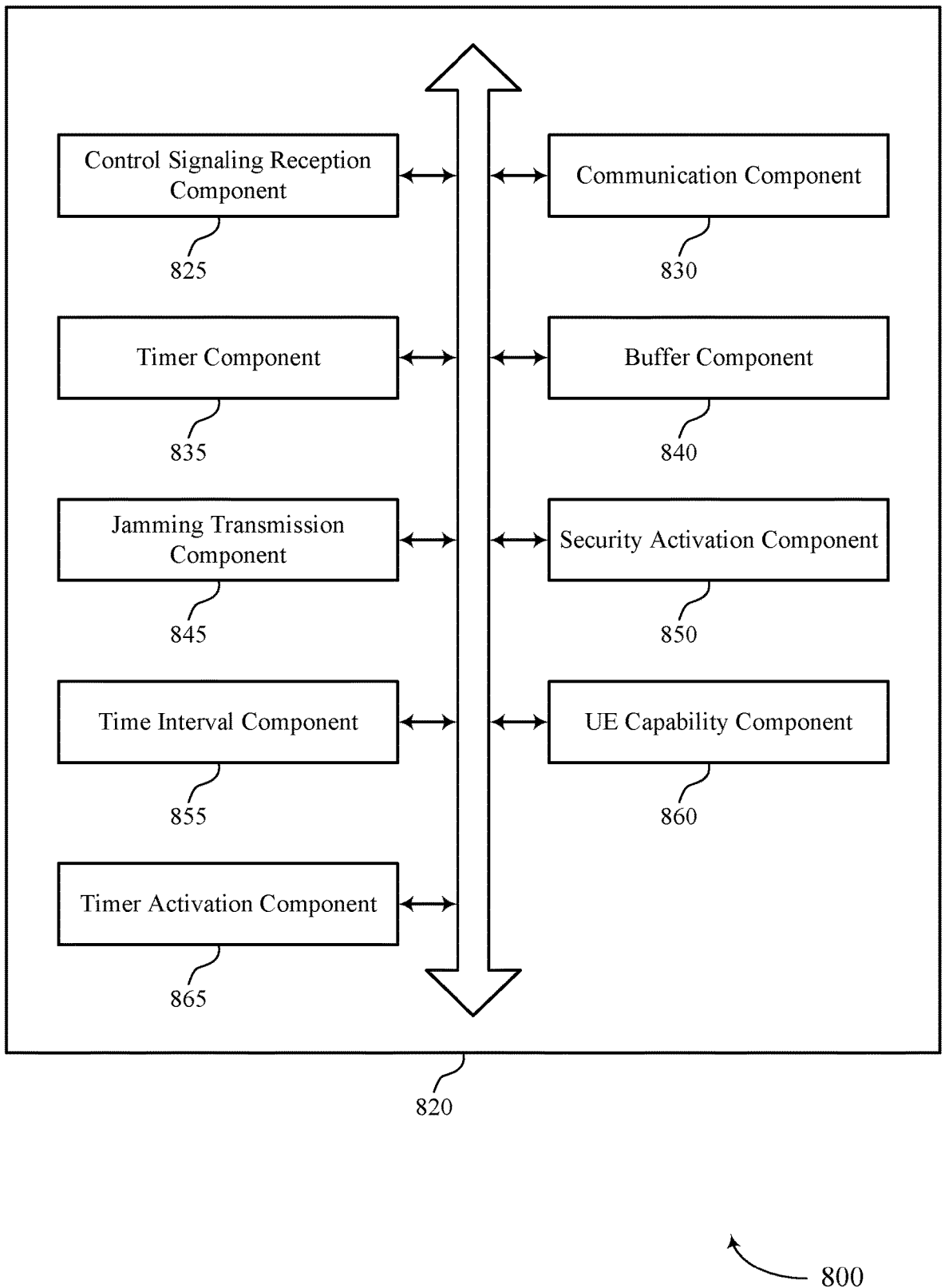
FIG. 8 shows a block diagram of a communications manager that supports physical layer security activation in accordance with aspects of the present disclosure.

FIG. 8 shows a block diagram 800 of a communications manager 820 that supports physical layer security activation in accordance with aspects of the present disclosure. The communications manager 820 may be an example of aspects of a communications manager 620, a communications manager 720, or both, as described herein. The communications manager 820, or various components thereof, may be an example of means for performing various aspects of physical layer security activation as described herein. For example, the communications manager 820 may include a control signaling reception component 825, a communication component 830, a timer component 835, a buffer component 840, a jamming transmission component 845, a security activation component 850, a time interval component 855, a UE capability component 860, a timer activation component 865, or any combination thereof. Each of these components may communicate, directly or indirectly, with one another (e.g., via one or more buses).

The communications manager 820 may support wireless communications at a UE in accordance with examples as disclosed herein. The control signaling reception component 825 may be configured as or otherwise support a means for receiving, from a base station, control signaling identifying a configuration of a set of time intervals for communication with the base station, the set of time intervals including a subset of the time intervals for which the UE is to perform a physical layer security procedure. The communication component 830 may be configured as or otherwise support a means for communicating, in the subset of the time intervals identified by the received control signaling, one or more messages using the physical layer security procedure.

In some examples, to support communicating the one or more messages in the subset of the time intervals using the physical layer security procedure, the jamming transmission component 845 may be configured as or otherwise support a means for transmitting a jamming signal concurrent to communicating at least a portion of the one or more messages.

In some examples, to support communicating the one or more messages in the subset of the time intervals using the physical layer security procedure, the communication component 830 may be configured as or otherwise support a means for encoding the one or more messages with a set of pseudo-random bits based on a channel capacity for a channel. In some examples, to support communicating the one or more messages in the subset of the time intervals using the physical layer security procedure, the communication component 830 may be configured as or otherwise support a means for transmitting the encoded one or more messages on the channel.

In some examples, to support communicating the one or more messages in the subset of the time intervals using the physical layer security procedure, the communication component 830 may be configured as or otherwise support a means for receiving the one or more messages encoded with a set of pseudo-random bits on a channel. In some examples, to support communicating the one or more messages in the subset of the time intervals using the physical layer security procedure, the communication component 830 may be configured as or otherwise support a means for decoding the one or more messages from the set of pseudo-random bits based on a channel capacity of the channel.

In some examples, the security activation component 850 may be configured as or otherwise support a means for activating the physical layer security procedure in response to receiving the control signaling.

In some examples, the communication component 830 may be configured as or otherwise support a means for determining to perform the physical layer security procedure within the subset of the time intervals for at least uplink, or downlink, or both, based on the control signaling indicating one or more directions, where communicating the one or more messages in the subset of the time intervals using the physical layer security procedure is further based on the one or more messages corresponding to at least one of the indicated one or more directions.

In some examples, the time interval component 855 may be configured as or otherwise support a means for determining, from the set of time intervals, at least a set of symbols, or a set of slots, or a set of subframes, or a combination thereof configured for the physical layer security procedure based on the control signaling.

In some examples, the control signaling includes a bitmap indicating at least the set of symbols, or the set of slots, or the set of subframes, or the combination thereof configured for the physical layer security procedure, the determining based on the bitmap.

In some examples, the control signaling indicates at least a granularity of time resources configured for performing the physical layer security procedure, or a pattern of the time resources configured for performing the physical layer security procedure, or both, where the subset of the time intervals corresponds to at least the granularity, or the pattern, or both. In some examples, the control signaling indicates at least a start time for the subset of the time intervals, or a length for the subset of the time intervals, or both.

In some examples, the UE capability component 860 may be configured as or otherwise support a means for transmitting, to the base station, a UE capability message indicating a full-duplex capability of the UE, where receiving the control signaling configuring the UE to perform the physical layer security procedure is at least in part in response to the UE capability message indicating the full-duplex capability of the UE.

In some examples, the control signaling includes at least RRC signaling, or DCI signaling, or MAC-CE signaling, or a combination thereof.

In some examples, the timer activation component 865 may be configured as or otherwise support a means for activating a timer associated with performing the physical layer security procedure in response to a trigger. In some examples, the communication component 830 may be configured as or otherwise support a means for communicating using the physical layer security procedure based on the timer being active.

In some examples, the timer activation component 865 may be configured as or otherwise support a means for receiving, from the base station, additional control signaling configuring at least the timer, or an active length for the timer, or the trigger for activating the timer, or a combination thereof. In some examples, the control signaling may activate the timer, where the trigger for activating the timer corresponds to receiving the control signaling.

In some examples, the buffer component 840 may be configured as or otherwise support a means for adding first data to be communicated using the physical layer security procedure to a first buffer, where the trigger for activating the timer corresponds to a quantity of data in the first buffer satisfying a threshold quantity. In some examples, the buffer component 840 may be configured as or otherwise support a means for adding second data to be communicated without the physical layer security procedure to a second buffer different from the first buffer.

In some examples, the timer activation component 865 may be configured as or otherwise support a means for scheduling transmission of the one or more messages based on the timer being active and the one or more messages including information corresponding to a security level satisfying a threshold security level, where communicating the one or more messages using the physical layer security procedure is further based on the scheduling.

In some examples, the timer activation component 865 may be configured as or otherwise support a means for detecting the trigger for activating the timer based on at least a MAC layer operation, or a PDCP layer operation, or an APP layer operation, or a combination thereof.

Additionally or alternatively, the communications manager 820 may support wireless communications at a UE in accordance with examples as disclosed herein. The timer component 835 may be configured as or otherwise support a means for activating a timer associated with performing a physical layer security procedure in response to a trigger. The communication component 830 may be configured as or otherwise support a means for communicating a message using the physical layer security procedure based on the timer being active.

In some examples, the timer component 835 may be configured as or otherwise support a means for receiving, from a base station, control signaling configuring at least the timer, or an active length for the timer, or the trigger for activating the timer, or a combination thereof.

In some examples, the timer component 835 may be configured as or otherwise support a means for receiving, from a base station, control signaling activating the timer, where the trigger for activating the timer corresponds to receiving the control signaling.

In some examples, the buffer component 840 may be configured as or otherwise support a means for adding first data to be communicated using the physical layer security procedure to a first buffer, where the trigger for activating the timer corresponds to a quantity of data in the first buffer satisfying a threshold quantity. In some examples, the buffer component 840 may be configured as or otherwise support a means for adding second data to be communicated without the physical layer security procedure to a second buffer different from the first buffer.

In some examples, the timer component 835 may be configured as or otherwise support a means for scheduling transmission of the message based on the timer being active and the message including information corresponding to a security level satisfying a threshold security level, where communicating the message using the physical layer security procedure is further based on the scheduling.

In some examples, the timer component 835 may be configured as or otherwise support a means for detecting the trigger for activating the timer based on at least a MAC layer operation, or a PDCP layer operation, or an APP layer operation, or a combination thereof.

In some cases, the control signaling reception component 825, the communication component 830, the timer component 835, the buffer component 840, the jamming transmission component 845, the security activation component 850, the time interval component 855, the UE capability component 860, the timer activation component 865, or a combination thereof may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling reception component 825, the communication component 830, the timer component 835, the buffer component 840, the jamming transmission component 845, the security activation component 850, the time interval component 855, the UE capability component 860, the timer activation component 865, or a combination thereof discussed herein.

Figure 9:
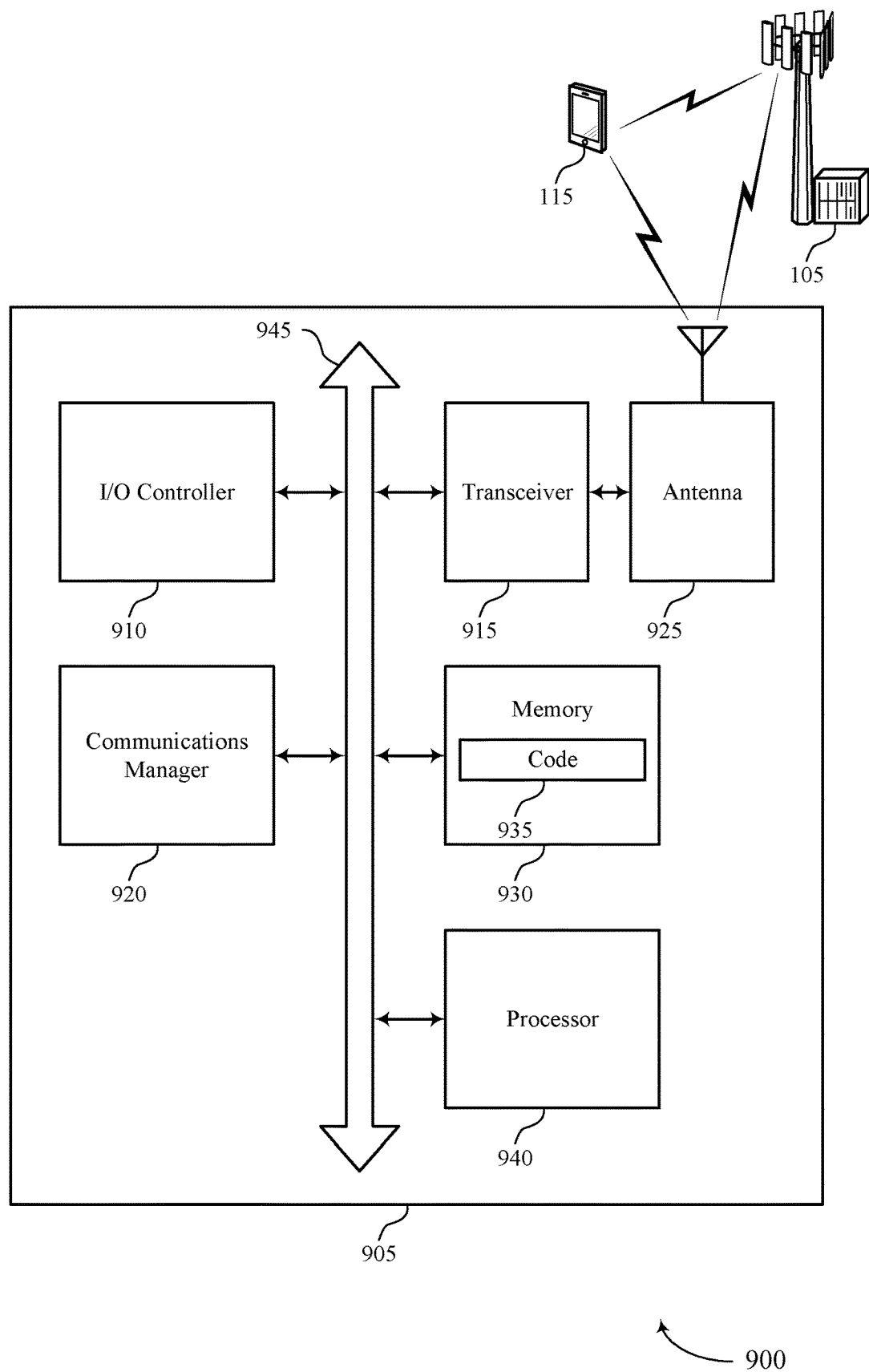
FIG. 9 shows a diagram of a system including a device that supports physical layer security activation in accordance with aspects of the present disclosure.

FIG. 9 shows a diagram of a system 900 including a device 905 that supports physical layer security activation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting physical layer security activation). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, control signaling identifying a configuration of a set of time intervals for communication with the base station, the set of time intervals including a subset of the time intervals for which the UE is to perform a physical layer security procedure. The communications manager 920 may be configured as or otherwise support a means for communicating, in the subset of the time intervals identified by the received control signaling, one or more messages using the physical layer security procedure.

Additionally or alternatively, the communications manager 920 may support wireless communications at a UE in accordance with examples as disclosed herein. For example, the communications manager 920 may be configured as or otherwise support a means for activating a timer associated with performing a physical layer security procedure in response to a trigger. The communications manager 920 may be configured as or otherwise support a means for communicating a message using the physical layer security procedure based on the timer being active.

By including or configuring the communications manager 920 in accordance with examples as described herein, the device 905 may support techniques for improved security by using secrecy intervals in which physical layer security procedures are activated, which may improve security, improve time and resource efficiency, decrease power consumption, or any combination thereof. As such, supported techniques may include improved network operations and, in some examples, may promote network efficiencies, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of physical layer security activation as described herein, or the processor 940 and the memory 930 may be otherwise configured to perform or support such operations.

Figure 10:
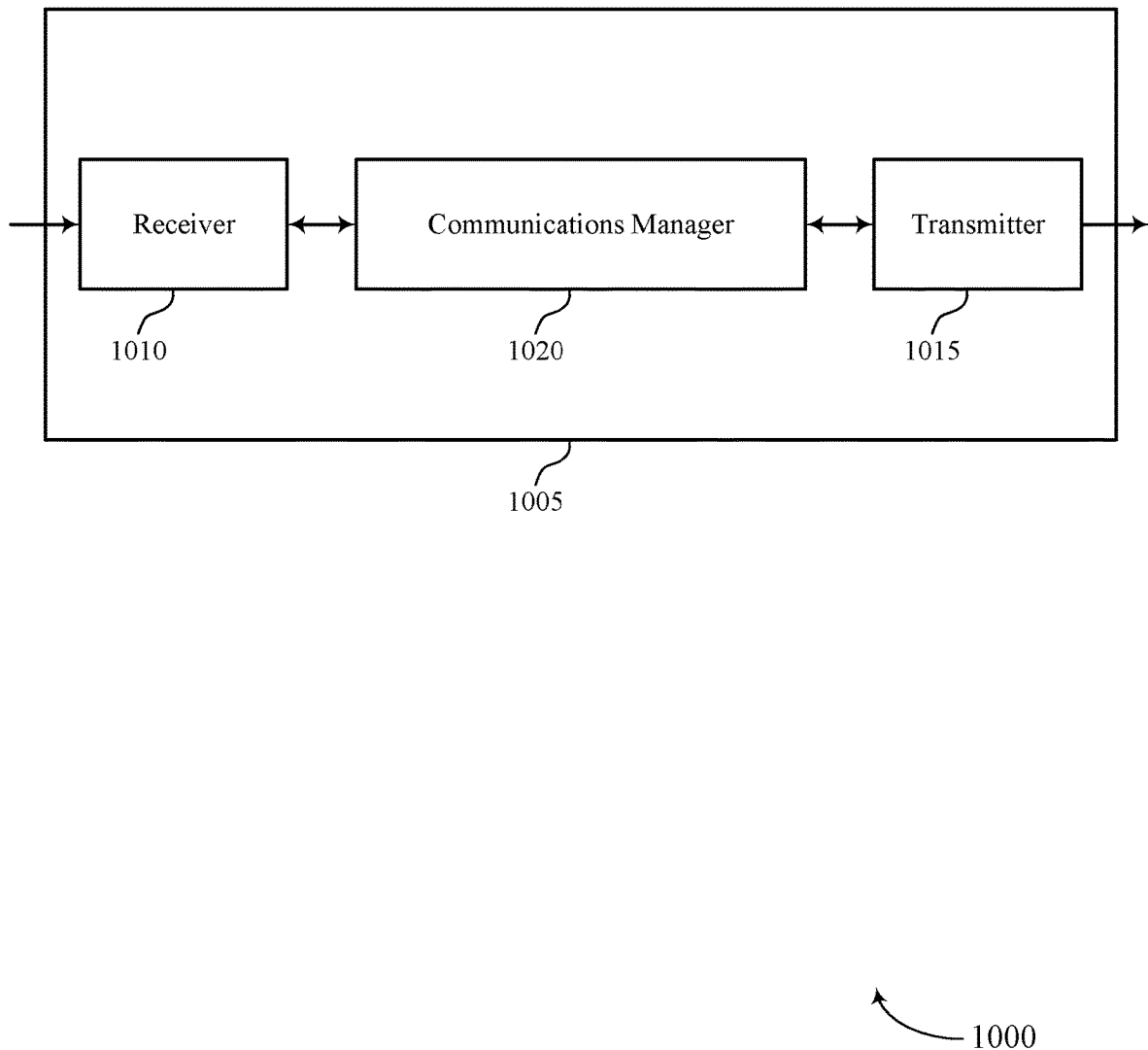
FIGS. 10 and 11 show block diagrams of devices that support physical layer security activation in accordance with aspects of the present disclosure.

FIG. 10 shows a block diagram 1000 of a device 1005 that supports physical layer security activation in accordance with aspects of the present disclosure. The device 1005 may be an example of aspects of a base station 105 as described herein. The device 1005 may include a receiver 1010, a transmitter 1015, and a communications manager 1020. The device 1005 may also include one or more processors, memory coupled with the one or more processors, and instructions stored in the memory that are executable by the one or more processors to enable the one or more processors to perform the physical layer security features as discussed herein. Each of these components may be in communication with one another (e.g., via one or more buses).

The receiver 1010 may provide a means for receiving information such as packets, user data, control information, or any combination thereof associated with various information channels (e.g., control channels, data channels, information channels related to physical layer security activation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to physical layer security activation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of physical layer security activation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, control signaling identifying a configuration of a set of time intervals for communication with the base station, the set of time intervals including a subset of the time intervals for which the UE is to perform a physical layer security procedure. The communications manager 1020 may be configured as or otherwise support a means for communicating, in the subset of the time intervals identified by the transmitted control signaling, one or more messages using the physical layer security procedure.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for improved security. For example, the device 1005 may perform physical layer security procedures by using secrecy intervals, which may improve time and resource efficiency while decreasing power consumption. As such, supported techniques may include improved network operations and, in some examples, may promote network efficiencies, among other benefits.

Figure 11:
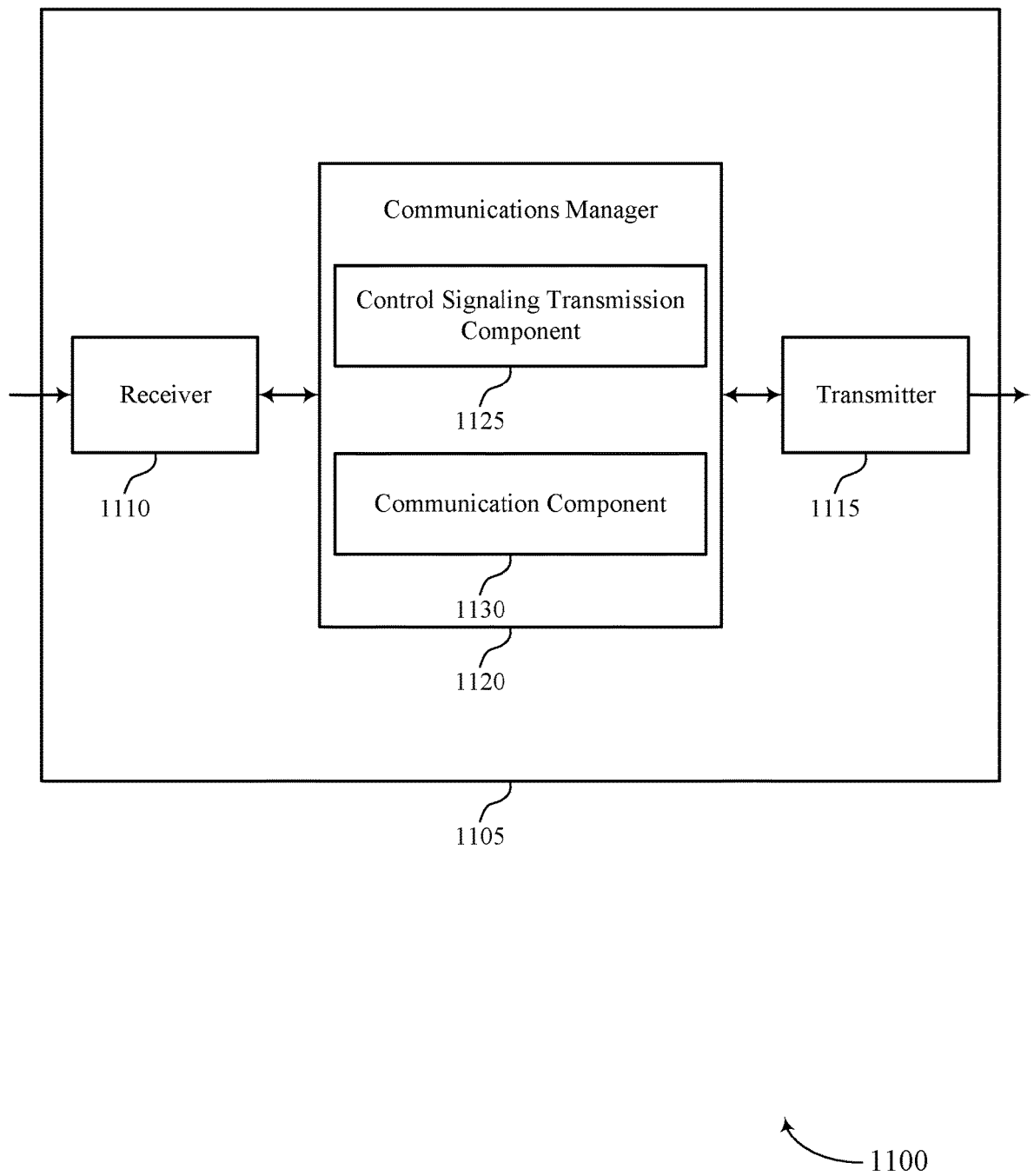

FIG. 11 shows a block diagram 1100 of a device 1105 that supports physical layer security activation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to physical layer security activation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to physical layer security activation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of physical layer security activation as described herein. For example, the communications manager 1120 may include a control signaling transmission component 1125, a communication component 1130, or both. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The control signaling transmission component 1125 may be configured as or otherwise support a means for transmitting, to a UE, control signaling identifying a configuration of a set of time intervals for communication with the base station, the set of time intervals including a subset of the time intervals for which the UE is to perform a physical layer security procedure. The communication component 1130 may be configured as or otherwise support a means for communicating, in the subset of the time intervals identified by the transmitted control signaling, one or more messages using the physical layer security procedure.

In some cases, the control signaling transmission component 1125, the communication component 1130, or both may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling transmission component 1125, the communication component 1130, or both discussed herein. A transceiver processor may be collocated with a transceiver of the device, communicate with (e.g., direct the operations of) a transceiver of the device, or both. A radio processor may be collocated with a radio (e.g., an NR radio, an LTE radio, a Wi-Fi radio) of the device, communicate with (e.g., direct the operations of) a radio of the device, or both. A transmitter processor may be collocated with a transmitter of the device, communicate with (e.g., direct the operations of) a transmitter of the device, or both. A receiver processor may be collocated with a receiver of the device, communicate with (e.g., direct the operations of) a receiver of the device, or both.

Figure 12:
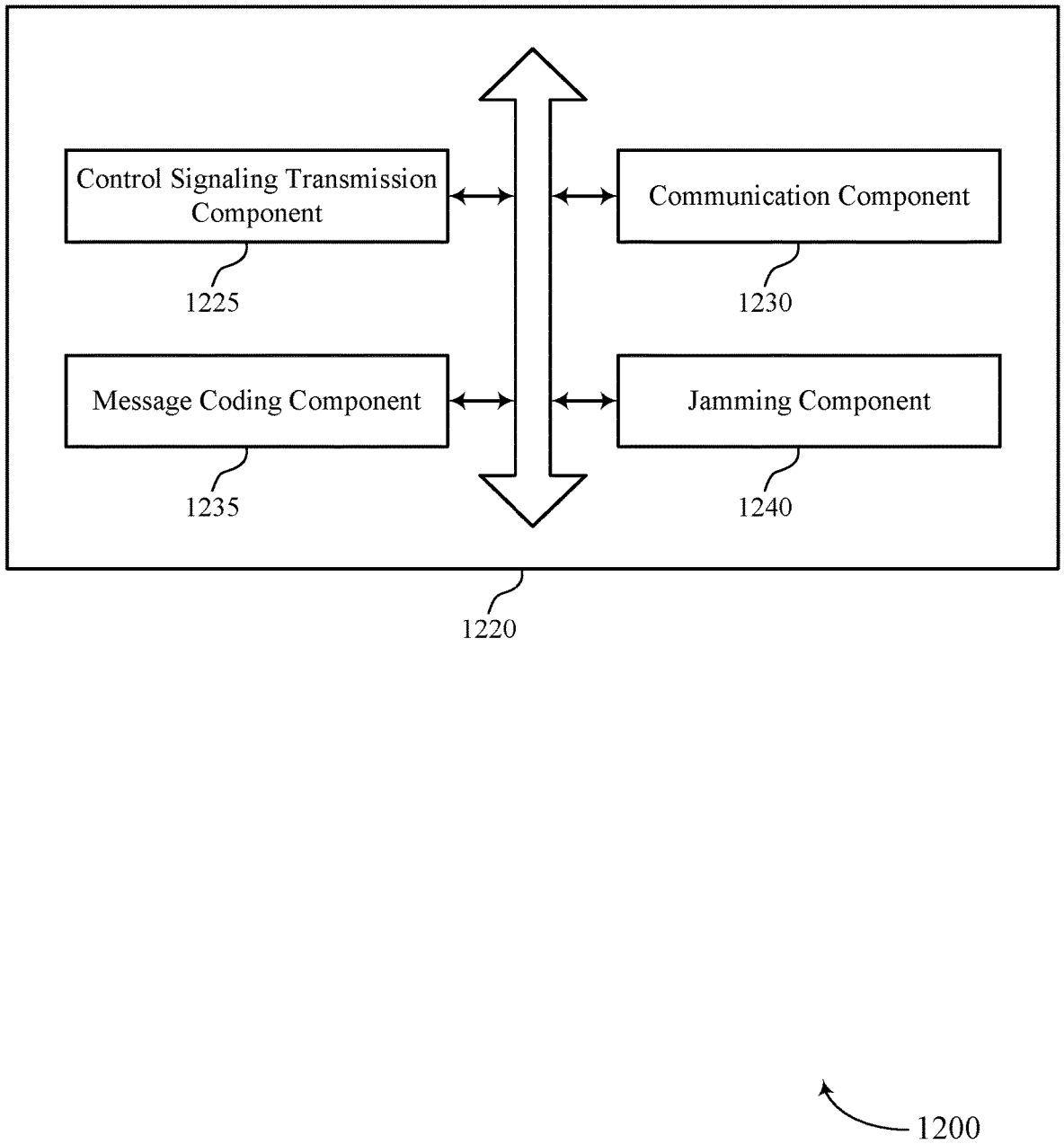
FIG. 12 shows a block diagram of a communications manager that supports physical layer security activation in accordance with aspects of the present disclosure.

FIG. 12 shows a block diagram 1200 of a communications manager 1220 that supports physical layer security activation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of physical layer security activation as described herein. For example, the communications manager 1220 may include a control signaling transmission component 1225, a communication component 1230, a message coding component 1235, a jamming component 1240, or any combination thereof. Each of these components may communicate, directly or indirectly, with one another (e.g., via one or more buses).

The communications manager 1220 may support wireless communications at a base station in accordance with examples as disclosed herein. The control signaling transmission component 1225 may be configured as or otherwise support a means for transmitting, to a UE, control signaling identifying a configuration of a set of time intervals for communication with the base station, the set of time intervals including a subset of the time intervals for which the UE is to perform a physical layer security procedure. The communication component 1230 may be configured as or otherwise support a means for communicating, in the subset of the time intervals identified by the transmitted control signaling, one or more messages using the physical layer security procedure.

In some examples, to support communicating the one or more messages in the subset of the time intervals using the physical layer security procedure, the message coding component 1235 may be configured as or otherwise support a means for encoding the one or more messages with a set of pseudo-random bits based on a channel capacity for a channel. In some examples, to support communicating the one or more messages in the subset of the time intervals using the physical layer security procedure, the communication component 1230 may be configured as or otherwise support a means for transmitting the encoded one or more messages on the channel.

In some examples, to support communicating the one or more messages in the subset of the time intervals based on configuring the UE to perform the physical layer security procedure, the communication component 1230 may be configured as or otherwise support a means for receiving the one or more messages encoded with a set of pseudo-random bits on a channel. In some examples, to support communicating the one or more messages in the subset of the time intervals based on configuring the UE to perform the physical layer security procedure, the message coding component 1235 may be configured as or otherwise support a means for decoding the one or more messages from the set of pseudo-random bits based on a channel capacity of the channel.

In some examples, the jamming component 1240 may be configured as or otherwise support a means for transmitting, to a second UE different from the UE, a jamming signal concurrent to communicating at least a portion of the one or more messages based on the physical layer security procedure.

In some cases, the control signaling transmission component 1225, the communication component 1230, the message coding component 1235, the jamming component 1240, or a combination thereof may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling transmission component 1225, the communication component 1230, the message coding component 1235, the jamming component 1240, or a combination thereof discussed herein.

Figure 13:
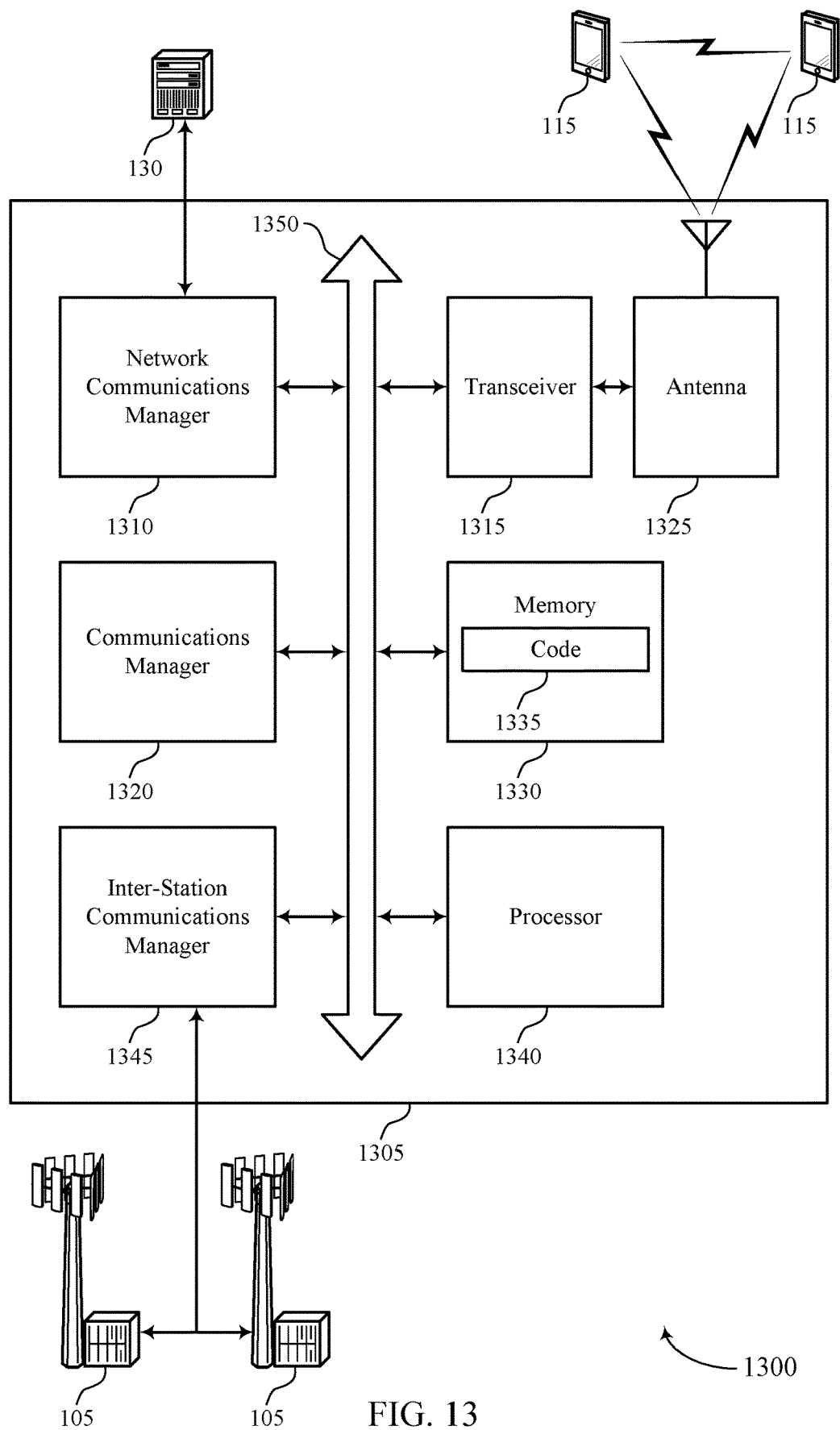
FIG. 13 shows a diagram of a system including a device that supports physical layer security activation in accordance with aspects of the present disclosure.

FIG. 13 shows a diagram of a system 1300 including a device 1305 that supports physical layer security activation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting physical layer security activation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, control signaling identifying a configuration of a set of time intervals for communication with the base station, the set of time intervals including a subset of the time intervals for which the UE is to perform a physical layer security procedure. The communications manager 1320 may be configured as or otherwise support a means for communicating, in the subset of the time intervals identified by the transmitted control signaling, one or more messages using the physical layer security procedure.

By including or configuring the communications manager 1320 in accordance with examples as described herein, the device 1305 may support techniques for improved physical layer security procedures by using secrecy intervals, which may improve time and resource efficiency while decreasing power consumption. As such, supported techniques may include improved network operations and, in some examples, may promote network efficiencies, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of physical layer security activation as described herein, or the processor 1340 and the memory 1330 may be otherwise configured to perform or support such operations.

Figure 14:
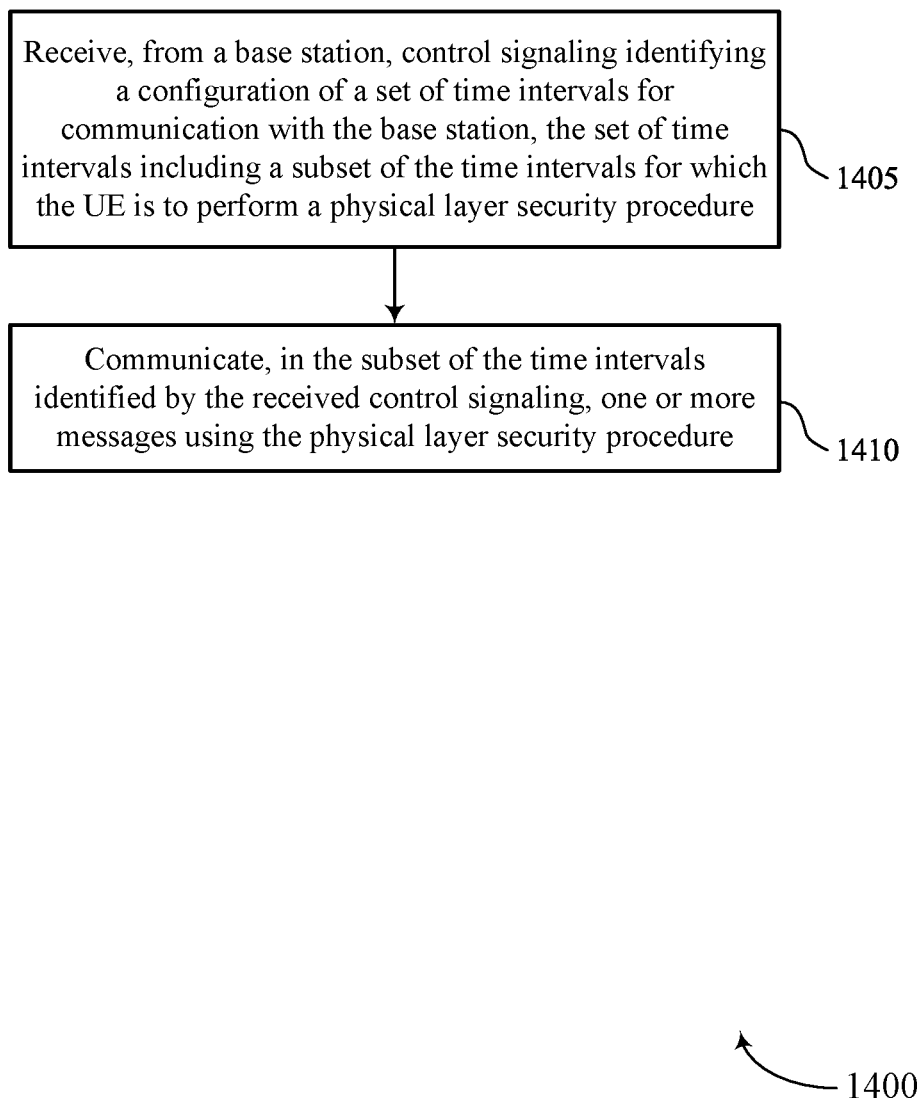
FIGS. 14 through 18 show flowcharts illustrating methods that support physical layer security activation in accordance with aspects of the present disclosure.

FIG. 14 shows a flowchart illustrating a method 1400 that supports physical layer security activation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling identifying a configuration of a set of time intervals for communication with the base station, the set of time intervals including a subset of the time intervals for which the UE is to perform a physical layer security procedure. The operations of 1405 may be performed in accordance with examples as disclosed herein. In some examples, aspects of the operations of 1405 may be performed by a control signaling reception component 825 as described with reference to FIG. 8.

At 1410, the method may include communicating, in the subset of the time intervals identified by the received control signaling, one or more messages using the physical layer security procedure. The operations of 1410 may be performed in accordance with examples as disclosed herein. In some examples, aspects of the operations of 1410 may be performed by a communication component 830 as described with reference to FIG. 8.

Figure 15:
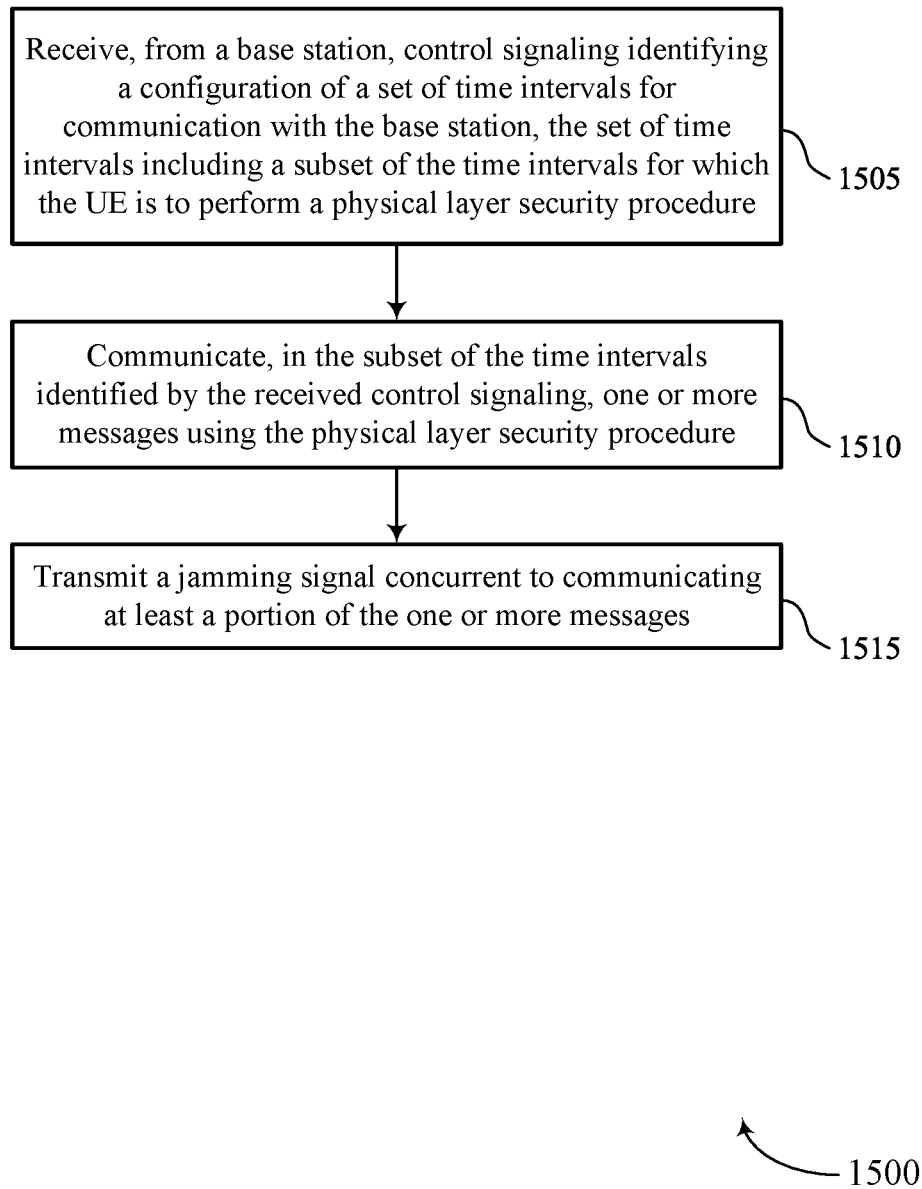

FIG. 15 shows a flowchart illustrating a method 1500 that supports physical layer security activation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling identifying a configuration of a set of time intervals for communication with the base station, the set of time intervals including a subset of the time intervals for which the UE is to perform a physical layer security procedure. The operations of 1505 may be performed in accordance with examples as disclosed herein. In some examples, aspects of the operations of 1505 may be performed by a control signaling reception component 825 as described with reference to FIG. 8.

At 1510, the method may include communicating, in the subset of the time intervals identified by the received control signaling, one or more messages using the physical layer security procedure. The operations of 1510 may be performed in accordance with examples as disclosed herein. In some examples, aspects of the operations of 1510 may be performed by a communication component 830 as described with reference to FIG. 8.

At 1515, the method may include transmitting a jamming signal concurrent to communicating at least a portion of the one or more messages. The operations of 1515 may be performed in accordance with examples as disclosed herein. In some examples, aspects of the operations of 1515 may be performed by a jamming transmission component 845 as described with reference to FIG. 8.

Figure 16:
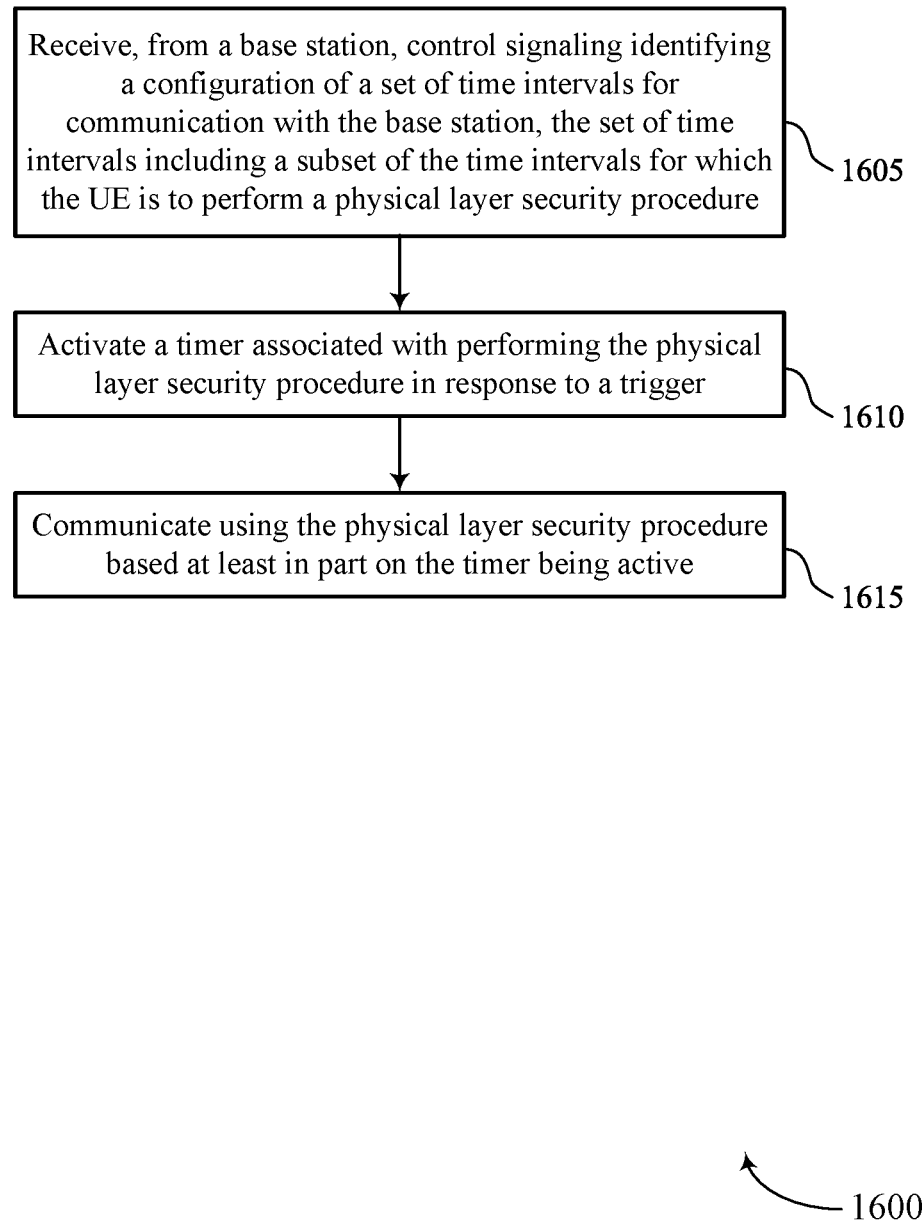

FIG. 16 shows a flowchart illustrating a method 1600 that supports physical layer security activation in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling identifying a configuration of a set of time intervals for communication with the base station, the set of time intervals including a subset of the time intervals for which the UE is to perform a physical layer security procedure. The operations of 1605 may be performed in accordance with examples as disclosed herein. In some examples, aspects of the operations of 1605 may be performed by a control signaling reception component 825 as described with reference to FIG. 8.

At 1610, the method may include activating a timer associated with performing the physical layer security procedure in response to a trigger. The operations of 1610 may be performed in accordance with examples as disclosed herein. In some examples, aspects of the operations of 1610 may be performed by a timer activation component 865 as described with reference to FIG. 8.

At 1615, the method may include communicating using the physical layer security procedure based on the timer being active. The operations of 1615 may be performed in accordance with examples as disclosed herein. In some examples, aspects of the operations of 1615 may be performed by a communication component 830 as described with reference to FIG. 8.

Figure 17:
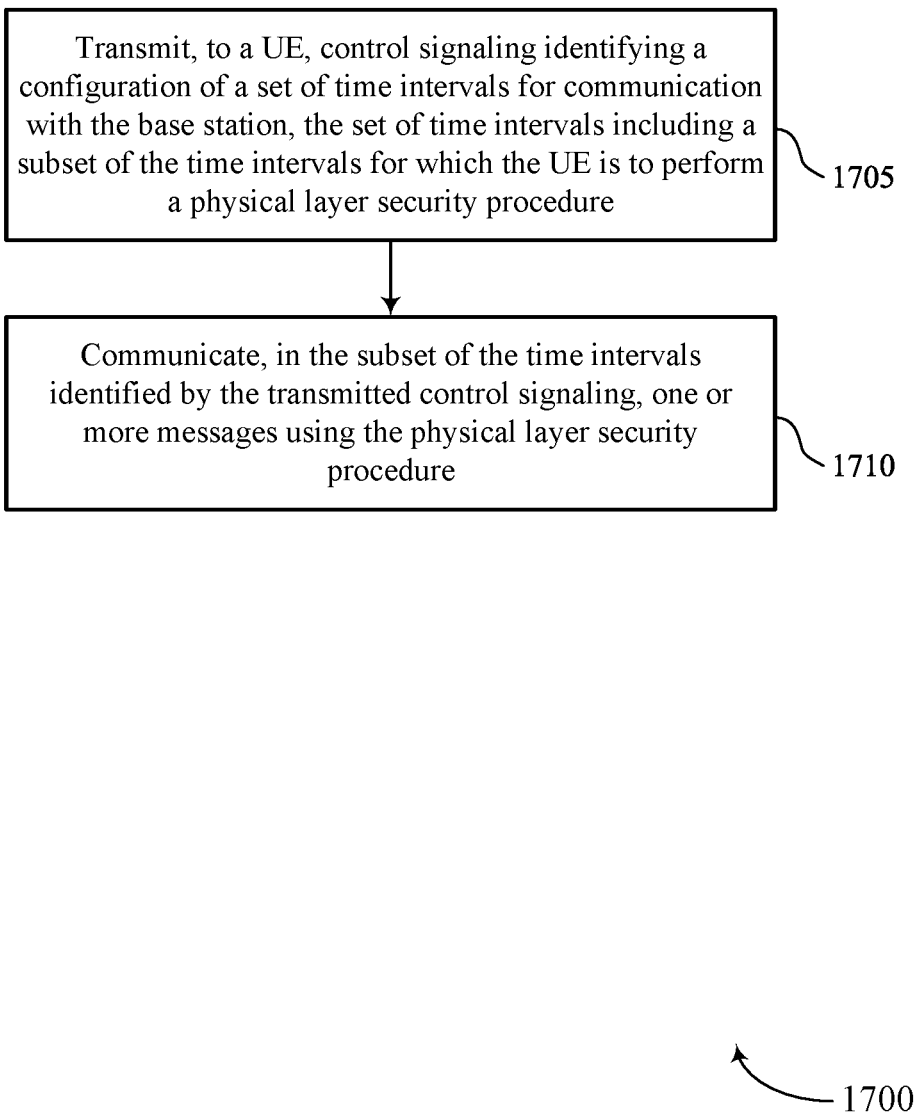

FIG. 17 shows a flowchart illustrating a method 1700 that supports physical layer security activation in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, control signaling identifying a configuration of a set of time intervals for communication with the base station, the set of time intervals including a subset of the time intervals for which the UE is to perform a physical layer security procedure. The operations of 1705 may be performed in accordance with examples as disclosed herein. In some examples, aspects of the operations of 1705 may be performed by a control signaling transmission component 1225 as described with reference to FIG. 12.

At 1710, the method may include communicating, in the subset of the time intervals identified by the transmitted control signaling, one or more messages using the physical layer security procedure. The operations of 1710 may be performed in accordance with examples as disclosed herein. In some examples, aspects of the operations of 1710 may be performed by a communication component 1230 as described with reference to FIG. 12.

Figure 18:
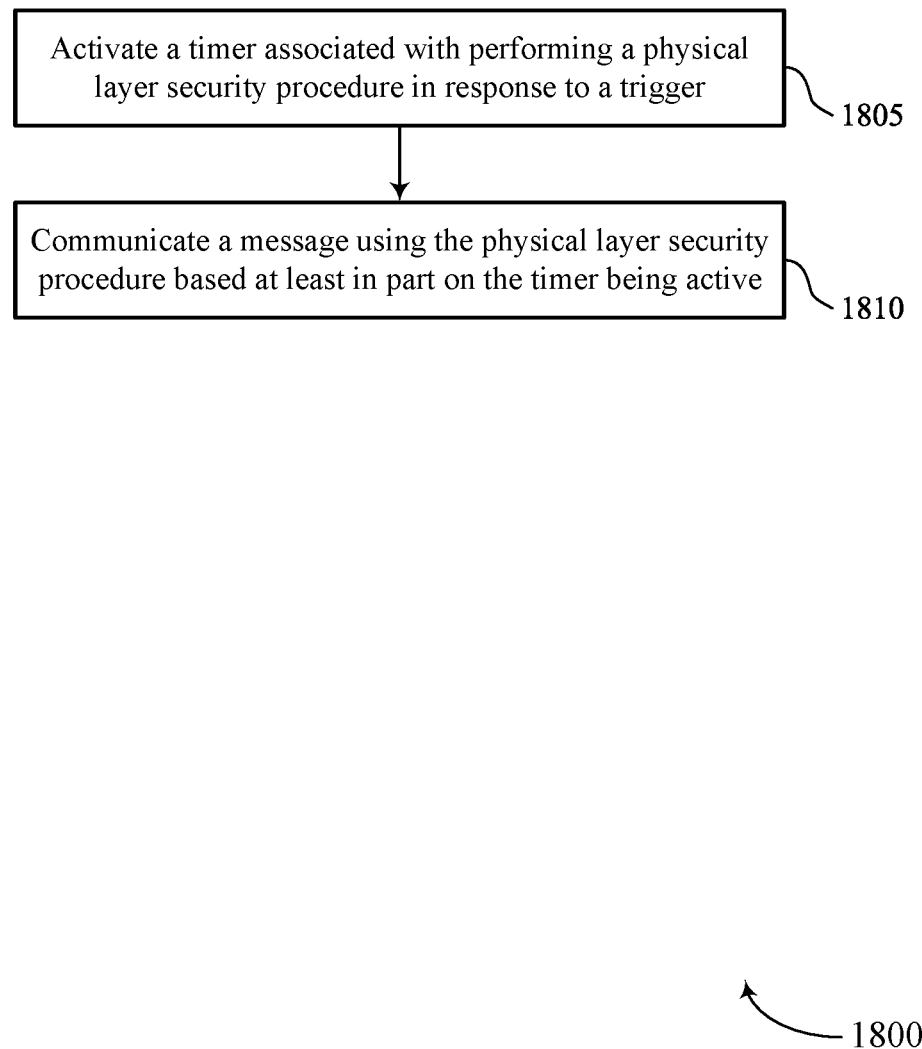

FIG. 18 shows a flowchart illustrating a method 1800 that supports physical layer security activation in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include activating a timer associated with performing a physical layer security procedure in response to a trigger. The operations of 1805 may be performed in accordance with examples as disclosed herein. In some examples, aspects of the operations of 1805 may be performed by a timer component 835 as described with reference to FIG. 8.

At 1810, the method may include communicating a message using the physical layer security procedure based on the timer being active. The operations of 1810 may be performed in accordance with examples as disclosed herein. In some examples, aspects of the operations of 1810 may be performed by a communication component 830 as described with reference to FIG. 8.

The following provides an overview of aspects of the present disclosure:

Aspect 1: A method for wireless communications at a UE, comprising: receiving, from a base station, control signaling identifying a configuration of a set of time intervals for communication with the base station, the set of time intervals including a subset of the time intervals for which the UE is to perform a physical layer security procedure; and communicating, in the subset of the time intervals identified by the received control signaling, one or more messages using the physical layer security procedure.

Aspect 2: The method of aspect 1, wherein communicating the one or more messages in the subset of the time intervals using the physical layer security procedure comprises: transmitting a jamming signal concurrent to communicating at least a portion of the one or more messages.

Aspect 3: The method of any of aspects 1 through 2, wherein communicating the one or more messages in the subset of the time intervals using the physical layer security procedure comprises: encoding the one or more messages with a set of pseudo-random bits based at least in part on a channel capacity for a channel; and transmitting the encoded one or more messages on the channel.

Aspect 4: The method of any of aspects 1 through 2, wherein communicating the one or more messages in the subset of the time intervals using the physical layer security procedure comprises: receiving the one or more messages encoded with a set of pseudo-random bits on a channel; and decoding the one or more messages from the set of pseudo-random bits based at least in part on a channel capacity of the channel.

Aspect 5: The method of any of aspects 1 through 4, further comprising: activating the physical layer security procedure in response to receiving the control signaling.

Aspect 6: The method of any of aspects 1 through 5, further comprising: determining to perform the physical layer security procedure within the subset of the time intervals for at least uplink, or downlink, or both, based at least in part on the control signaling indicating one or more directions, wherein communicating the one or more messages in the subset of the time intervals using the physical layer security procedure is further based at least in part on the one or more messages corresponding to at least one of the indicated one or more directions.

Aspect 7: The method of any of aspects 1 through 6, further comprising: determining, from the set of time intervals, at least a set of symbols, or a set of slots, or a set of subframes, or a combination thereof configured for the physical layer security procedure based at least in part on the control signaling.

Aspect 8: The method of aspect 7, wherein the control signaling comprises a bitmap indicating at least the set of symbols, or the set of slots, or the set of subframes, or the combination thereof configured for the physical layer security procedure, the determining based at least in part on the bitmap.

Aspect 9: The method of any of aspects 1 through 8, wherein the control signaling indicates at least a granularity of time resources configured for performing the physical layer security procedure, or a pattern of the time resources configured for performing the physical layer security procedure, or both, and wherein the subset of the time intervals corresponds to at least the granularity, or the pattern, or both.

Aspect 10: The method of any of aspects 1 through 9, wherein the control signaling indicates at least a start time for the subset of the time intervals, or a length for the subset of the time intervals, or both.

Aspect 11: The method of any of aspects 1 through 10, further comprising: transmitting, to the base station, a UE capability message indicating a full-duplex capability of the UE, wherein receiving the control signaling configuring the UE to perform the physical layer security procedure is at least in part in response to the UE capability message indicating the full-duplex capability of the UE.

Aspect 12: The method of any of aspects 1 through 11, wherein the control signaling comprises at least RRC signaling, or DCI signaling, or MAC-CE signaling, or a combination thereof.

Aspect 13: The method of any of aspects 1 through 12, further comprising: activating a timer associated with performing the physical layer security procedure in response to a trigger; and communicating using the physical layer security procedure based at least in part on the timer being active.

Aspect 14: The method of aspect 13, further comprising: receiving, from a base station, additional control signaling configuring at least the timer, or an active length for the timer, or the trigger for activating the timer, or a combination thereof.

Aspect 15: The method of any of aspects 13 through 14, wherein the control signaling activates the timer, wherein the trigger for activating the timer corresponds to receiving the control signaling.

Aspect 16: The method of any of aspects 13 through 15, further comprising: adding first data to be communicated using the physical layer security procedure to a first buffer, wherein the trigger for activating the timer corresponds to a quantity of data in the first buffer satisfying a threshold quantity; and adding second data to be communicated without the physical layer security procedure to a second buffer different from the first buffer.

Aspect 17: The method of any of aspects 13 through 16, further comprising: scheduling transmission of the one or more messages based at least in part on the timer being active and the one or more messages comprising information corresponding to a security level satisfying a threshold security level, wherein communicating the one or more messages using the physical layer security procedure is further based at least in part on the scheduling.

Aspect 18: The method of any of aspects 13 through 17, further comprising: detecting the trigger for activating the timer based at least in part on at least a MAC layer operation, or a PDCP layer operation, or an APP layer operation, or a combination thereof.

Aspect 19: A method for wireless communications at a base station, comprising: transmitting, to a UE, control signaling identifying a configuration of a set of time intervals for communication with the base station, the set of time intervals including a subset of the time intervals for which the UE is to perform a physical layer security procedure; and communicating, in the subset of the time intervals identified by the transmitted control signaling, one or more messages using the physical layer security procedure Aspect 20: The method of aspect 19, wherein communicating the one or more messages in the subset of the time intervals using the physical layer security procedure comprises: encoding the one or more messages with a set of pseudo-random bits based at least in part on a channel capacity for a channel; and transmitting the encoded one or more messages on the channel.

Aspect 21: The method of aspect 19, wherein communicating the one or more messages in the subset of the time intervals based at least in part on configuring the UE to perform the physical layer security procedure comprises: receiving the one or more messages encoded with a set of pseudo-random bits on a channel; and decoding the one or more messages from the set of pseudo-random bits based at least in part on a channel capacity of the channel.

Aspect 22: The method of any of aspects 19 through 21, further comprising: transmitting, to a second UE different from the UE, a jamming signal concurrent to communicating at least a portion of the one or more messages based at least in part on the physical layer security procedure.

Aspect 23: A method for wireless communications at a UE, comprising: activating a timer associated with performing a physical layer security procedure in response to a trigger; and communicating a message using the physical layer security procedure based at least in part on the timer being active.

Aspect 24: The method of aspect 23, further comprising: receiving, from a base station, control signaling configuring at least the timer, or an active length for the timer, or the trigger for activating the timer, or a combination thereof.

Aspect 25: The method of any of aspects 23 through 24, further comprising: receiving, from a base station, control signaling activating the timer, wherein the trigger for activating the timer corresponds to receiving the control signaling.

Aspect 26: The method of any of aspects 23 through 24, further comprising: adding first data to be communicated using the physical layer security procedure to a first buffer, wherein the trigger for activating the timer corresponds to a quantity of data in the first buffer satisfying a threshold quantity.

Aspect 27: The method of aspect 26, further comprising: adding second data to be communicated without the physical layer security procedure to a second buffer different from the first buffer.

Aspect 28: The method of any of aspects 23 through 27, further comprising: scheduling transmission of the message based at least in part on the timer being active and the message comprising information corresponding to a security level satisfying a threshold security level, wherein communicating the message using the physical layer security procedure is further based at least in part on the scheduling.

Aspect 29: The method of any of aspects 23 through 28, further comprising: detecting the trigger for activating the timer based at least in part on at least a MAC layer operation, or a PDCP layer operation, or an APP layer operation, or a combination thereof.

Aspect 30: An apparatus for wireless communications at a UE, comprising a processor; memory coupled with the processor; and instructions stored in the memory and executable by the processor to cause the apparatus to perform a method of any of aspects 1 through 18.

Aspect 31: An apparatus for wireless communications at a UE, comprising at least one means for performing a method of any of aspects 1 through 18.

Aspect 32: A non-transitory computer-readable medium storing code for wireless communications at a UE, the code comprising instructions executable by a processor to perform a method of any of aspects 1 through 18.

Aspect 33: An apparatus for wireless communications at a base station, comprising a processor; memory coupled with the processor; and instructions stored in the memory and executable by the processor to cause the apparatus to perform a method of any of aspects 19 through 22.

Aspect 34: An apparatus for wireless communications at a base station, comprising at least one means for performing a method of any of aspects 19 through 22.

Aspect 35: A non-transitory computer-readable medium storing code for wireless communications at a base station, the code comprising instructions executable by a processor to perform a method of any of aspects 19 through 22.

Aspect 36: An apparatus for wireless communications at a UE, comprising a processor; memory coupled with the processor; and instructions stored in the memory and executable by the processor to cause the apparatus to perform a method of any of aspects 23 through 29.

Aspect 37: An apparatus for wireless communications at a UE, comprising at least one means for performing a method of any of aspects 23 through 29.

Aspect 38: A non-transitory computer-readable medium storing code for wireless communications at a UE, the code comprising instructions executable by a processor to perform a method of any of aspects 23 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving control signaling identifying a configuration of a set of time intervals for communication with a base station, the set of time intervals including a subset of time intervals for which the UE is to perform a physical layer security procedure;
   activating a timer associated with performing the physical layer security procedure; and
   communicating, via the subset of time intervals, one or more messages using the physical layer security procedure based at least in part on the timer being active for the subset of time intervals.

2. The method of claim 1, wherein communicating the one or more messages via the subset of time intervals using the physical layer security procedure comprises:

transmitting a jamming signal concurrent to communicating at least a portion of the one or more messages.

3. The method of claim 1, wherein communicating the one or more messages via the subset of time intervals using the physical layer security procedure comprises:
encoding the one or more messages with a set of pseudo-random bits based at least in part on a channel capacity for a channel; and
transmitting the encoded one or more messages via the channel.

4. The method of claim 1, wherein communicating the one or more messages via the subset of time intervals using the physical layer security procedure comprises:
receiving the one or more messages encoded with a set of pseudo-random bits via a channel; and
decoding the one or more messages from the set of pseudo-random bits based at least in part on a channel capacity of the channel.

5. The method of claim 1, further comprising:
activating the physical layer security procedure in response to receiving the control signaling.

6. The method of claim 1, further comprising:
determining to perform the physical layer security procedure within the subset of time intervals for at least uplink, or downlink, or both, based at least in part on the control signaling indicating one or more directions, wherein communicating the one or more messages via the subset of time intervals using the physical layer security procedure is further based at least in part on the one or more messages corresponding to at least one of the indicated one or more directions.

7. The method of claim 1, further comprising:
determining, from the set of time intervals, at least a set of symbols, or a set of slots, or a set of subframes, or a combination thereof configured for the physical layer security procedure based at least in part on the control signaling.

8. The method of claim 7, wherein the control signaling comprises a bitmap indicating at least the set of symbols, or the set of slots, or the set of subframes, or the combination thereof configured for the physical layer security procedure, the determining based at least in part on the bitmap.

9. The method of claim 1, wherein the control signaling indicates at least a granularity of time resources configured for performing the physical layer security procedure, or a pattern of the time resources configured for performing the physical layer security procedure, or both, and wherein the subset of time intervals corresponds to at least the granularity, or the pattern, or both.

10. The method of claim 1, wherein the control signaling indicates at least a start time for the subset of time intervals, or a length for the subset of time intervals, or both.

11. The method of claim 1, further comprising:
transmitting, to the base station, a UE capability message indicating a full-duplex capability of the UE, wherein receiving the control signaling configuring the UE to perform the physical layer security procedure is at least in part in response to the UE capability message indicating the full-duplex capability of the UE.

12. The method of claim 1, wherein the control signaling comprises at least radio resource control signaling, or downlink control information signaling, or medium access control element signaling, or a combination thereof.

13. The method of claim 1, wherein activating the timer comprises:
activating the timer in response to a trigger.

14. The method of claim 13, further comprising:
receiving, from the base station, additional control signaling configuring at least the timer, or an active length for the timer, or the trigger for activating the timer, or a combination thereof.

15. The method of claim 13, wherein the control signaling activates the timer, wherein the trigger for activating the timer corresponds to receiving the control signaling.

16. The method of claim 13, further comprising:
adding first data to be communicated using the physical layer security procedure to a first buffer, wherein the trigger for activating the timer corresponds to a quantity of data in the first buffer satisfying a threshold quantity; and
adding second data to be communicated without the physical layer security procedure to a second buffer different from the first buffer.

17. The method of claim 1, further comprising:
scheduling transmission of the one or more messages based at least in part on the timer being active and the one or more messages comprising information corresponding to a security level satisfying a threshold security level, wherein communicating the one or more messages using the physical layer security procedure is further based at least in part on the scheduling.

18. The method of claim 13, further comprising:
detecting the trigger for activating the timer based at least in part on at least a medium access control layer operation, or a packet data convergence protocol layer operation, or an application layer operation, or a combination thereof.

19. A method for wireless communications at a base station, comprising:
transmitting control signaling identifying a configuration of a set of time intervals for communication with the base station, the set of time intervals including a subset of time intervals for which a user equipment (UE) is to perform a physical layer security procedure; and
communicating, via the subset of time intervals, one or more messages using the physical layer security procedure based at least in part on a timer associated with performing the physical layer security procedure being active for the subset of time intervals.

20. The method of claim 19, wherein communicating the one or more messages via the subset of time intervals using the physical layer security procedure comprises:
encoding the one or more messages with a set of pseudo-random bits based at least in part on a channel capacity for a channel; and
transmitting the encoded one or more messages via the channel.

21. The method of claim 19, wherein communicating the one or more messages via the subset of time intervals based at least in part on configuring the UE to perform the physical layer security procedure comprises:
receiving the one or more messages encoded with a set of pseudo-random bits via a channel; and
decoding the one or more messages from the set of pseudo-random bits based at least in part on a channel capacity of the channel.

22. The method of claim 19, further comprising:
transmitting, to a second UE different from the UE, a jamming signal concurrent to communicating at least a portion of the one or more messages based at least in part on the physical layer security procedure.

23. A user equipment (UE) for wireless communications, comprising:

memory; and
one or more processors coupled with the memory and configured to cause the UE to:
receive control signaling identifying a configuration of a set of time intervals for communication with a base station, the set of time intervals including a subset of time intervals for which the UE is to perform a physical layer security procedure;
activate a timer associated with performing the physical layer security procedure; and
communicate, via the subset of time intervals, one or more messages using the physical layer security procedure based at least in part on the timer being active for the subset of time intervals.

24. The UE of claim 23, wherein the one or more processors are further configured to cause the UE to communicate the one or more messages via the subset of time intervals using the physical layer security procedure by being configured to cause the UE to:
transmit a jamming signal concurrent to communicating at least a portion of the one or more messages.

25. The UE of claim 23, wherein the one or more processors are further configured to cause the UE to communicate the one or more messages via the subset of time intervals using the physical layer security procedure by being configured to cause the UE to:
encode the one or more messages with a set of pseudo-random bits based at least in part on a channel capacity for a channel; and
transmit the encoded one or more messages via the channel.

26. The UE of claim 23, wherein the one or more processors are further configured to cause the UE to communicate the one or more messages via the subset of time intervals using the physical layer security procedure by being configured to cause the UE to:
receive the one or more messages encoded with a set of pseudo-random bits via a channel; and
decode the one or more messages from the set of pseudo-random bits based at least in part on a channel capacity of the channel.

27. The UE of claim 23, wherein the one or more processors are further configured to cause the UE to:
activate the physical layer security procedure in response to receiving the control signaling.

28. A base station for wireless communications, comprising:
memory; and
one or more processors coupled with the memory and configured to cause the base station to:
transmit control signaling identifying a configuration of a set of time intervals for communication with the base station, the set of time intervals including a subset of time intervals for which a user equipment (UE) is to perform a physical layer security procedure; and
communicate, via the subset of time intervals, one or more messages using the physical layer security procedure based at least in part on a timer associated with performing the physical layer security procedure being active for the subset of time intervals.

29. The base station of claim 28, wherein the one or more processors are further configured to cause the base station to communicate the one or more messages via the subset of time intervals using the physical layer security procedure by being configured to cause the base station to:
encode the one or more messages with a set of pseudo-random bits based at least in part on a channel capacity for a channel; and
transmit the encoded one or more messages via the channel.

30. The base station of claim 28, wherein the one or more processors are further configured to cause the base station to communicate the one or more messages via the subset of time intervals based at least in part on configuring the UE to perform the physical layer security procedure by being configured to cause the base station to:
receive the one or more messages encoded with a set of pseudo-random bits via a channel; and
decode the one or more messages from the set of pseudo-random bits based at least in part on a channel capacity of the channel.

* * * * *